United States Patent
Copeland, Jr.

(10) Patent No.: US 11,139,726 B2
(45) Date of Patent: *Oct. 5, 2021

(54) ELECTROMAGNETIC GENERATOR AND METHOD OF USING SAME

(71) Applicant: Prototus, LTD., San Pedro Town (BZ)

(72) Inventor: Carl E. Copeland, Jr., Burleson, TX (US)

(73) Assignee: Prototus, Ltd., San Pedro Town (BZ)

(*) Notice: Subject to any disclaimer, the term of this patent is extended or adjusted under 35 U.S.C. 154(b) by 0 days.

This patent is subject to a terminal disclaimer.

(21) Appl. No.: 16/363,713

(22) Filed: Mar. 25, 2019

(65) Prior Publication Data

US 2020/0028421 A1 Jan. 23, 2020

Related U.S. Application Data

(63) Continuation of application No. 14/359,884, filed as application No. PCT/US2011/062063 on Nov. 23, 2011, now Pat. No. 10,243,440.

(Continued)

(51) Int. Cl.
*H02K 21/40* (2006.01)
*H02K 21/38* (2006.01)
(Continued)

(52) U.S. Cl.
CPC .......... *H02K 21/40* (2013.01); *H02K 7/1807* (2013.01); *H02K 7/1838* (2013.01); *H02K 21/38* (2013.01); *H02K 21/42* (2013.01); *Y02E 10/72* (2013.01)

(58) Field of Classification Search
CPC .... H02K 21/40; H02K 7/1807; H02K 7/1838; H02K 21/38; H02K 21/42
(Continued)

(56) References Cited

U.S. PATENT DOCUMENTS 3,242,418 A * 3/1966 Mela .................. H02P 9/00
322/28
3,431,444 A 3/1969 Wilson
(Continued)

FOREIGN PATENT DOCUMENTS

EP 0932167 7/1999
GB 1 332 642 10/1973
(Continued)

OTHER PUBLICATIONS

PCT/US12/078372 International Search Report and Written Opinion dated Dec. 20, 2012.
(Continued)

*Primary Examiner* — Terrance L Kenerly
(74) *Attorney, Agent, or Firm* — Dunlap Codding, P.C.

(57) ABSTRACT

An electromagnetic generator comprises one or more flux assembly having at least one coil and at least one magnetic field source separated by a gap. An interference drum has a sidewall at least partially positioned inside the gap and comprising at least one magnetic field permeable zone and at least one magnetic field impermeable zone. The interference drum is movable relative to the at least one coil and to the at least one magnetic field source to alternatively position the at least one magnetic field permeable zone and the at least one magnetic field impermeable zone of the sidewall inside the gap. When the interference drum is moved, magnetic flux is created in the coil, and induces electrical current to flow into the coil. The coil may be connected to an external circuit, such that the electrical current may flow through the external circuit.

6 Claims, 28 Drawing Sheets

Related U.S. Application Data

(60) Provisional application No. 61/421,000, filed on Dec. 8, 2010.

(51) Int. Cl.
    *H02K 21/42*     (2006.01)
    *H02K 7/18*     (2006.01)

(58) Field of Classification Search
    USPC .......................................................... 310/46
    See application file for complete search history.

(56) References Cited

U.S. PATENT DOCUMENTS

| | | | |
|---|---|---|---|
| 3,983,430 A | 9/1976 | Howard | |
| 4,639,626 A | 1/1987 | McGee | |
| 4,757,224 A | 1/1988 | McGee et al. | |
| 6,140,730 A * | 10/2000 | Tkaczyk | H02K 21/24 310/181 |
| 6,373,162 B1 | 4/2002 | Liang et al. | |
| 6,750,588 B1 | 6/2004 | Gabrys | |
| 2004/0041409 A1 | 3/2004 | Gabrys | |
| 2005/0116569 A1 | 6/2005 | Fahy | |
| 2006/0290224 A1 | 12/2006 | Perez | |
| 2008/0185927 A1* | 8/2008 | Ritchey | H02K 7/108 310/78 |
| 2008/0238233 A1* | 10/2008 | El-Rafai | H02K 1/12 310/154.01 |
| 2011/0025158 A1* | 2/2011 | Aiki | H02K 21/24 310/156.01 |

FOREIGN PATENT DOCUMENTS

| | | |
|---|---|---|
| GB | 2 148 611 | 5/1985 |
| JP | 03-001694 | 8/1991 |
| JP | 08-084454 | 3/1996 |
| JP | 08-251894 | 9/1996 |
| JP | 2000-69732 | 3/2000 |
| JP | 2001-224154 | 8/2001 |
| JP | 2005-168190 | 6/2005 |
| JP | 2007-067252 | 3/2007 |
| JP | 2008-17578 | 1/2008 |
| KR | 2008-017578 | 1/2008 |
| WO | WO 1994/11940 | 5/1994 |
| WO | 2009/091248 | 7/2009 |
| WO | 2011/033370 | 3/2011 |
| WO | WO 2011/033370 | 3/2011 |
| WO | 2011/040982 | 4/2011 |

OTHER PUBLICATIONS

Japanese application No. 2015-160181Office Action dated Jun. 16, 2015.

Japanese application No. 2013-543198 Office Action dated May 27, 2014.

Israel Office Action (Israel Patent Application No. 226583); dated Apr. 6, 2017.

Extended European Search Report regarding European Patent App. No. 11847795.9, dated Jun. 29, 2017.

KIPO Notice of Preliminary Rejection regarding Korean Patent App. No. 10-2013-7017596, dated Mar. 28, 2018.

Examination Report regarding Indian Patent App. No. 4223/CHENP/2013, dated Jun. 18, 2018.

* cited by examiner

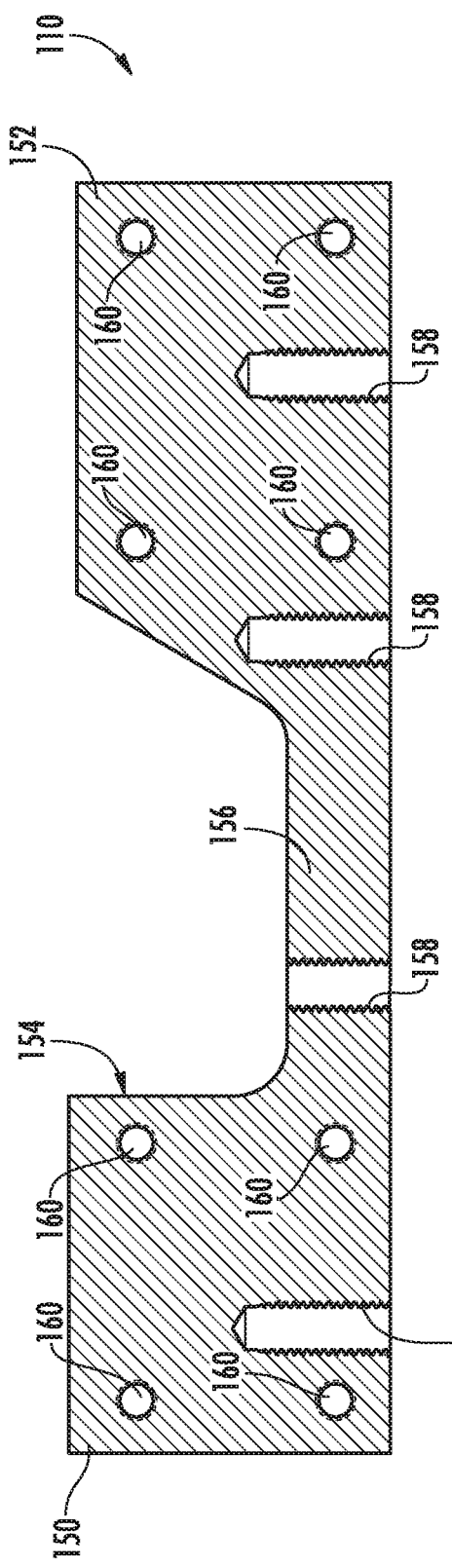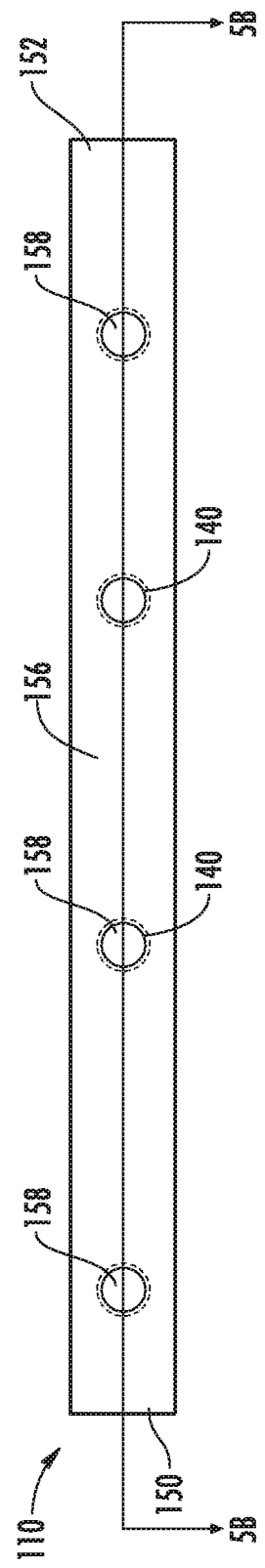

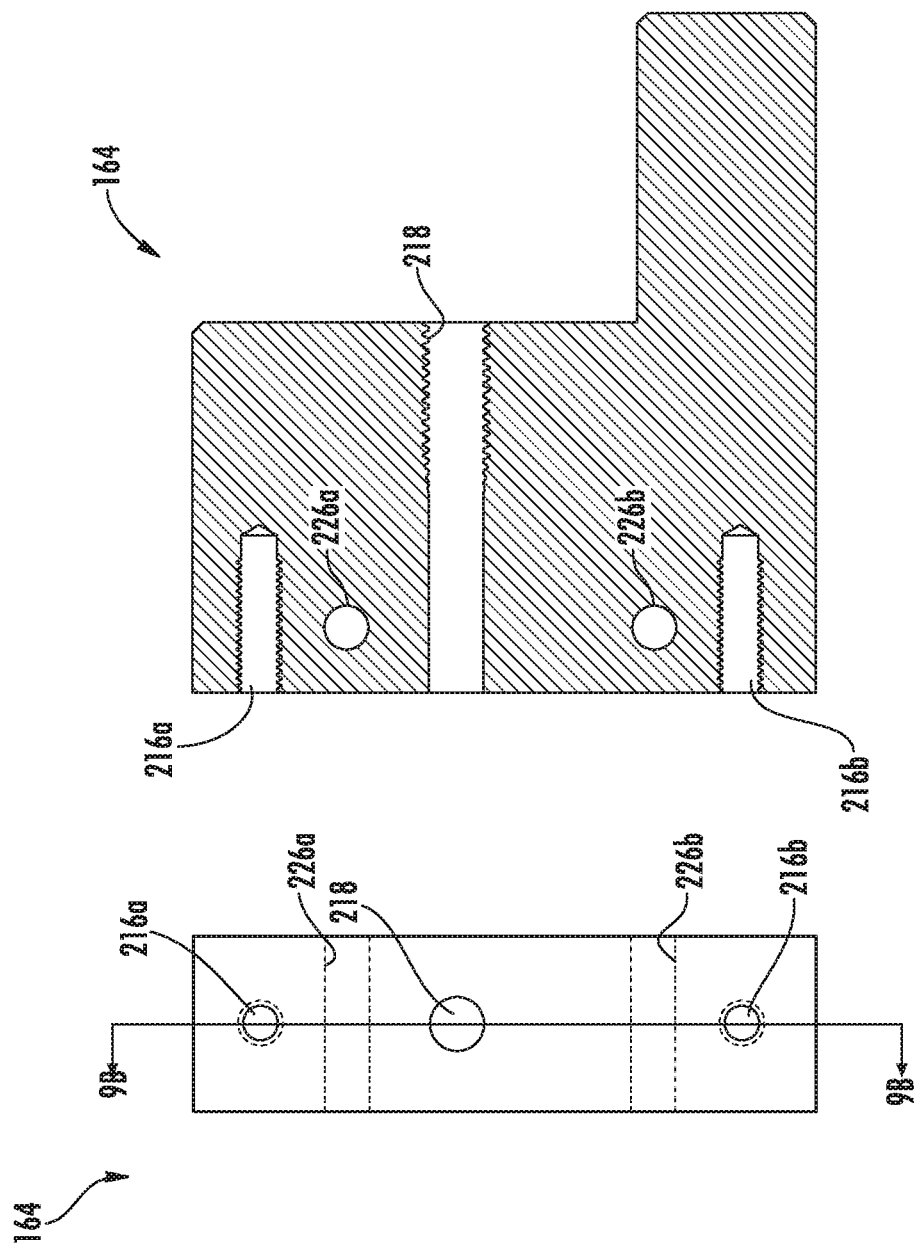

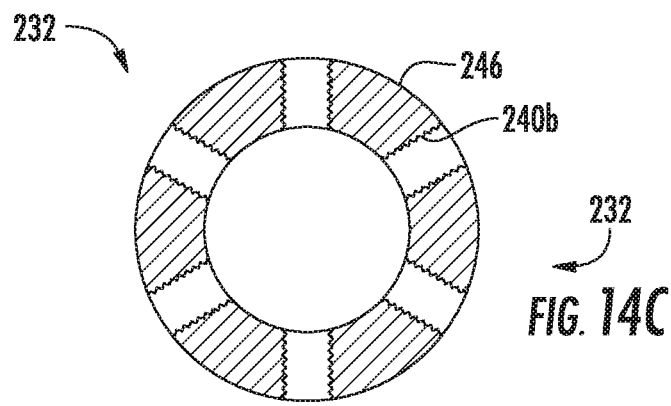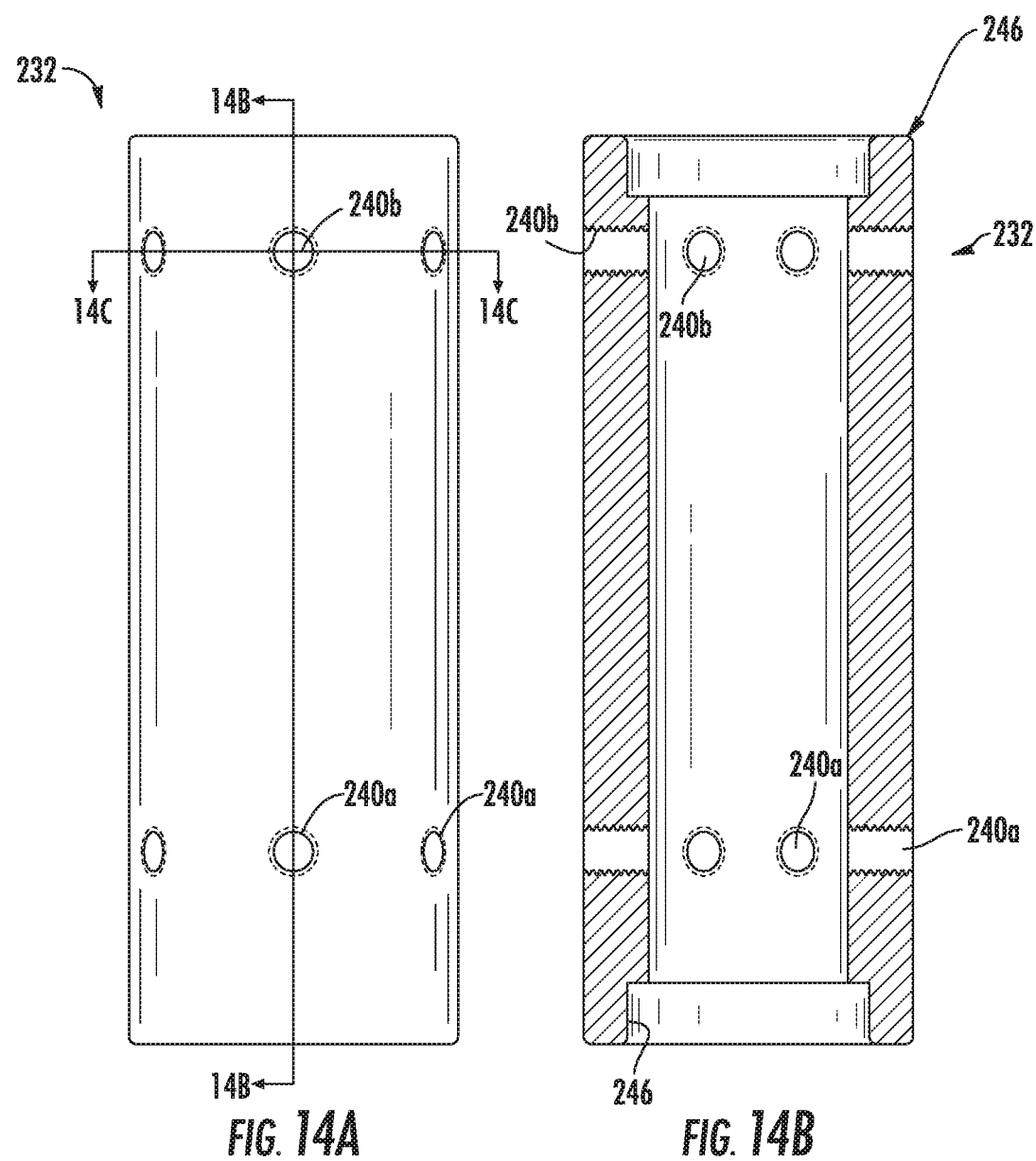
FIG. 14C
FIG. 14A
FIG. 14B

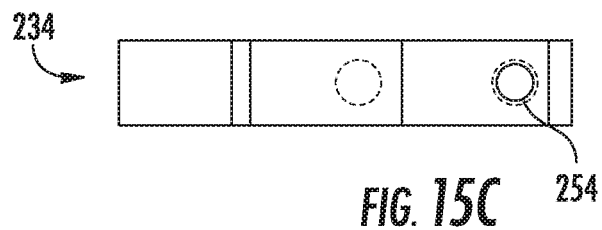
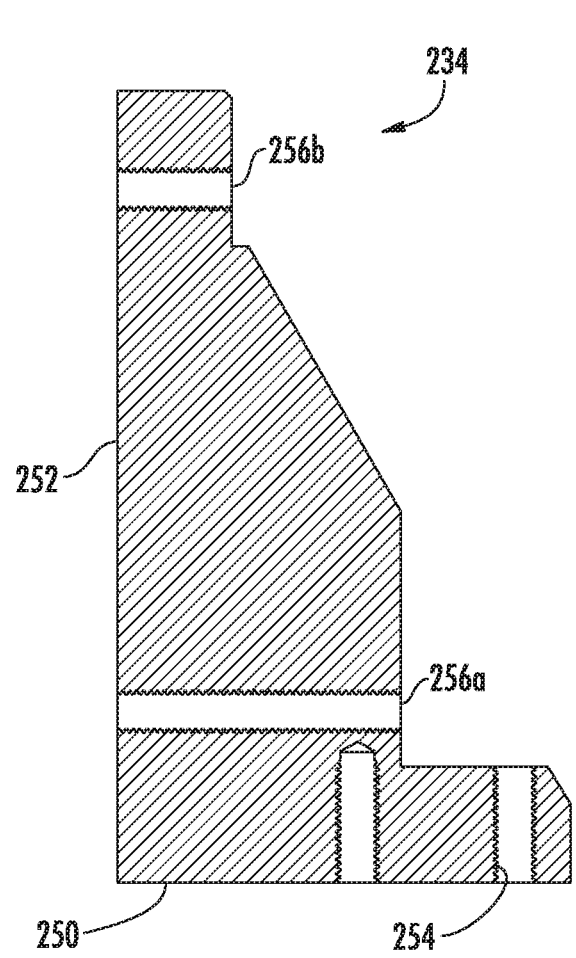 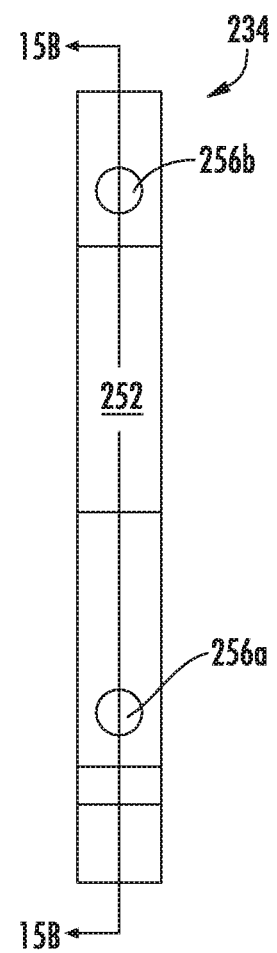
FIG. 15C
FIG. 15B
FIG. 15A

ELECTROMAGNETIC GENERATOR AND METHOD OF USING SAME

CROSS-REFERENCE TO RELATED APPLICATIONS

This application is a continuation of and claims priority to U.S. patent application Ser. No. 14/359,884, filed Mar. 13, 2015, which is a National Stage Entry of PCT/US11/62063 filed Nov. 23, 2011, claims the benefit under 35 U.S.C. 119 (e) of U.S. Provisional Application Ser. No. 61/421,000, filed Dec. 8, 2010, the entire contents of which are hereby expressly incorporated herein by reference.

FIELD OF INVENTIVE CONCEPTS

The inventive concepts disclosed herein generally relate to electromagnetic generators, and more particularly, but not by way of limitation, to an electromagnetic generator having an interference drum positioned between one or more coil assemblies and magnet assemblies.

BACKGROUND

The wind has historically been one of the most widely used natural resources to provide the energy necessary to power our needs. Windmills are still used to harness the wind's energy to grind grains into flour. Sailboats and windsurfs use sails to capture the power of the wind to travel across water. Recent increases in the demand for energy, combined with the dwindling supplies of fossil fuels, have caused electrical utility companies to take a renewed look at alternative methods for producing electrical power.

One alternative method of producing electrical power involves the harnessing of wind energy by a wind turbine to drive an electromagnetic generator. Wind turbines typically use a series of blades fixed to the top of a tower to rotate a shaft about a horizontal axis. The blades have an aerodynamic shape, such that when wind blows across the surface of the blades a lift force is generated causing the blades to rotate the shaft about its axis. The shaft is connected, typically via a gearbox, to an electromagnetic generator located in a structure called a nacelle which is positioned behind the blades. The gearbox converts the rotation speed of the blades into a rotation speed usable by the generator to produce electricity at a frequency that is proper for the electrical grid it is providing power to. The nacelle houses a number of components which are needed in modern high capacity wind turbines. In addition to the aforementioned gearbox and electromagnetic generator, other components may include a yaw drive which rotates the wind turbine, various controllers such as load balancing systems, and a brake that may be used to slow the generator down.

Electromagnetic generators are well known in the prior art. Broadly, electromagnetic generators generate electricity by varying a magnetic field, which induces electrical current in an adjacent coil. The magnetic field source has traditionally been a permanent magnet, but electromagnets have also been recently used.

Prior art devices typically use a magnetic field source, which is disposed adjacent to a coil, such that a small air gap separates the two. Several such pairs of magnetic field sources and coils may be used in a single device to increase efficiency. Most prior art devices operate by either moving the magnetic field source relative to the coil, or by moving the coil relative to the magnetic field source, to generate magnetic field fluctuations (also referred to as "magnetic flux" or "flux"), and thereby induce electrical current into the coils. To that end, most prior art devices use a stator and a rotor, the stator housing the stationary component, and the rotor moving the other component relative to the stationary one.

Additionally, there are several prior art devices that utilize a magnetic field blocking device to generate a magnetic flux within coils or windings to induce electrical current therein. The magnetic field blocking device is typically a magnetic field impermeable disk which has magnetic field permeable portions cut out in tooth-like or window-like configurations. The disk is disposed in the air gap between the magnetic field source and the coil. The flux-blocking disk is rotated in such a way as to alternatively allow axial flux to pass through from the magnetic field source to the coil, or to redirect the axial flux away from the coil. Alternatively, the flux-blocking disk is held stationary, and one of the coils or magnetic field source are rotated. For examples of such prior art devices see U.S. Pat. Nos. 3,431,444, 3,983,430, 4,639, 626, and 6,140,730.

A major disadvantage of such prior art devices is the axial orientation of the flux relative to the disk, which poses three main problems. First, the surface area across which axial flux is generated is limited by the radius of the disk. Second, the frequency of the induced electrical current varies across the length of the radius of the disk, due to the varying angular velocity of various points along the radius. Third, the impermeable portions of the disk are pulled by the magnetic field source, and the permeable portions are not pulled by the magnetic field source as they cross the air gap between the magnetic field source and the coil. This alternating pull causes the disk to resonate laterally away from its axis of rotation, which resonating motion will hereinafter be referred to as "wobble." The wobble is proportionally related to the radius of the disc, the strength of the magnetic field, and the rotations-per-minute (rpm or rpms) at which the disc rotates, and is inversely related to the thickness of the disk. In order to minimize the wobble, efficiency is sacrificed by lowering rpm, increasing the air gap between the magnetic field source and the coils to accommodate a thicker disc, and/or reducing the radius of the disc and thereby the surface area across which flux is generated.

Accordingly, there exists a need for a more efficient electromagnetic generator capable of operating at relatively low rpm and producing electrical current with minimal efficiency loss due to disk wobble, small surface area across which flux is generated, and/or air gap size. The inventive concepts disclosed herein are directed to such an electromagnetic generator and to method of using thereof.

SUMMARY

In one aspect, the inventive concepts disclosed herein are directed to an electromagnetic generator. The electromagnetic generator comprises one or more flux assembly having at least one coil and at least one magnetic field source separated by a gap and an interference drum having a sidewall. The sidewall is at least partially positioned inside the gap and has at least one magnetic field permeable zone and at least one magnetic field impermeable zone. The interference drum is movable relative to the at least one coil and to the at least one magnetic field source to alternatively position the at least one magnetic field permeable zone and the at least one magnetic field impermeable zone inside the gap.

In another aspect, the inventive concepts disclosed herein are directed to an interference drum adapted to be used in a generator of electrical energy. The interference drum comprises a hub and a sidewall extending from the hub. The sidewall comprises at least one magnetic field permeable zone and at least one magnetic field impermeable zone.

In yet another aspect, the inventive concepts disclosed herein are directed to a method, comprising attaching a mandrel having a wall to a hub and forming a sidewall of an interference drum with one or more alternating magnetic field permeable zone and one or more magnetic field impermeable zone.

In yet another aspect, the inventive concepts disclosed herein are directed to a method, comprising using an electromagnetic generator to generate electrical energy. The electromagnetic generator comprises (1) one or more flux assembly having at least one coil and at least one magnetic field source separated by a gap; (2) an interference drum having a sidewall comprising at least one magnetic field permeable zone and at least one magnetic field impermeable zone and being at least partially positioned inside the gap separating the at least one coil and the at least one magnetic field source. The interference drum is movable inside the gap to alternatively position the at least one magnetic field permeable zone and the at least one magnetic field impermeable zone inside the gap separating the at least one coil and the at least one magnetic field source to create magnetic flux into the at least one coil, such that electrical current is induced into the at least one coil. The method further comprises establishing a circuit between the at least one coil and a power grid to permit the electrical energy to flow to the power grid.

In yet another aspect, the inventive concepts disclosed herein are directed to a wind turbine, comprising a tower having a base and a generator mount and a generator assembly attached to the generator mount. The generator assembly comprises one or more flux assembly having at least one coil and at least one magnetic field source separated by a gap, and an interference drum having a sidewall comprising at least one magnetic field permeable zone and at least one magnetic field impermeable zone. The sidewall is at least partially rotatably positioned inside the gap separating the at least one coil and the at least one magnetic field source. The wind turbine further comprises a rotatable propeller operatively connected to the at least one of the interference drum and the one or more flux assembly. The interference drum is rotatable to alternatively position the at least one magnetic field permeable zone and the at least one magnetic field impermeable zone inside the gap separating the at least one coil and the at least one magnetic field source to create magnetic flux into the at least one coil such that electrical current is induced in the at least one coil.

In yet another aspect, the inventive concepts disclosed herein are directed to a wind turbine, comprising: (1) a base; (2) a nacelle connected to the base; and (3) a propeller having one or more blades and a first shaft rotatably connected to the nacelle. An electromagnetic generator at least partially disposed in the nacelle, the electromagnetic generator comprises: (a) a base plate defining a disk-shaped surface having a center; (b) one or more flux assembly attached to the base plate and radially extending thereon, the one or more flux assembly having at least one coil and at least one magnetic field source separated by an axial air gap; and (c) an interference drum having a second shaft rotatably extending through the base plate and operably connected to the first shaft of the propeller, and a cylindrical sidewall comprising at least one magnetic field permeable zone and at least one magnetic field impermeable zone at least partially positioned inside the axial gap. The interference drum is rotatable about the shaft to alternately position the at least one magnetic field permeable zone and the at least one magnetic field impermeable zone inside the axial air gap to create radial flux into the at least one coil such that electrical current is induced in the at least one coil.

BRIEF DESCRIPTION OF THE DRAWINGS

Like reference numerals in the drawings represent and refer to the same element or function. Implementations of the disclosure may be better understood when consideration is given to the following detailed description thereof. Such description makes reference to the annexed pictorial illustrations, schematics, graphs, drawings, and appendices. In the drawings:

FIG. 5A is a bottom plan view of the flux base shown in FIG. 2.

FIG. 5B is a cross-sectional view along line 5B-5B of FIG. 5A.

FIG. 9A is an end view of a slide of the magnet assembly shown in FIG. 8.

FIG. 9B is a cross-sectional view along line 9B-9B of FIG. 9A.

FIG. 14A is a side view of the bearing tube of the shaft support assembly shown in FIG. 13A.

FIG. 14B is a cross-sectional view taken along line 14B-14B of FIG. 14A.

FIG. 14C is a cross-sectional view taken along line 14C-14C of FIG. 14A.

FIG. 15A is an end view of the gusset shown in FIG. 13A.

FIG. 15B is a cross-sectional view along line 15B-15B of FIG. 15A.

FIG. 15C is a top plan view of the gusset shown in FIG. 15A.

DETAILED DESCRIPTION

Figure 1:
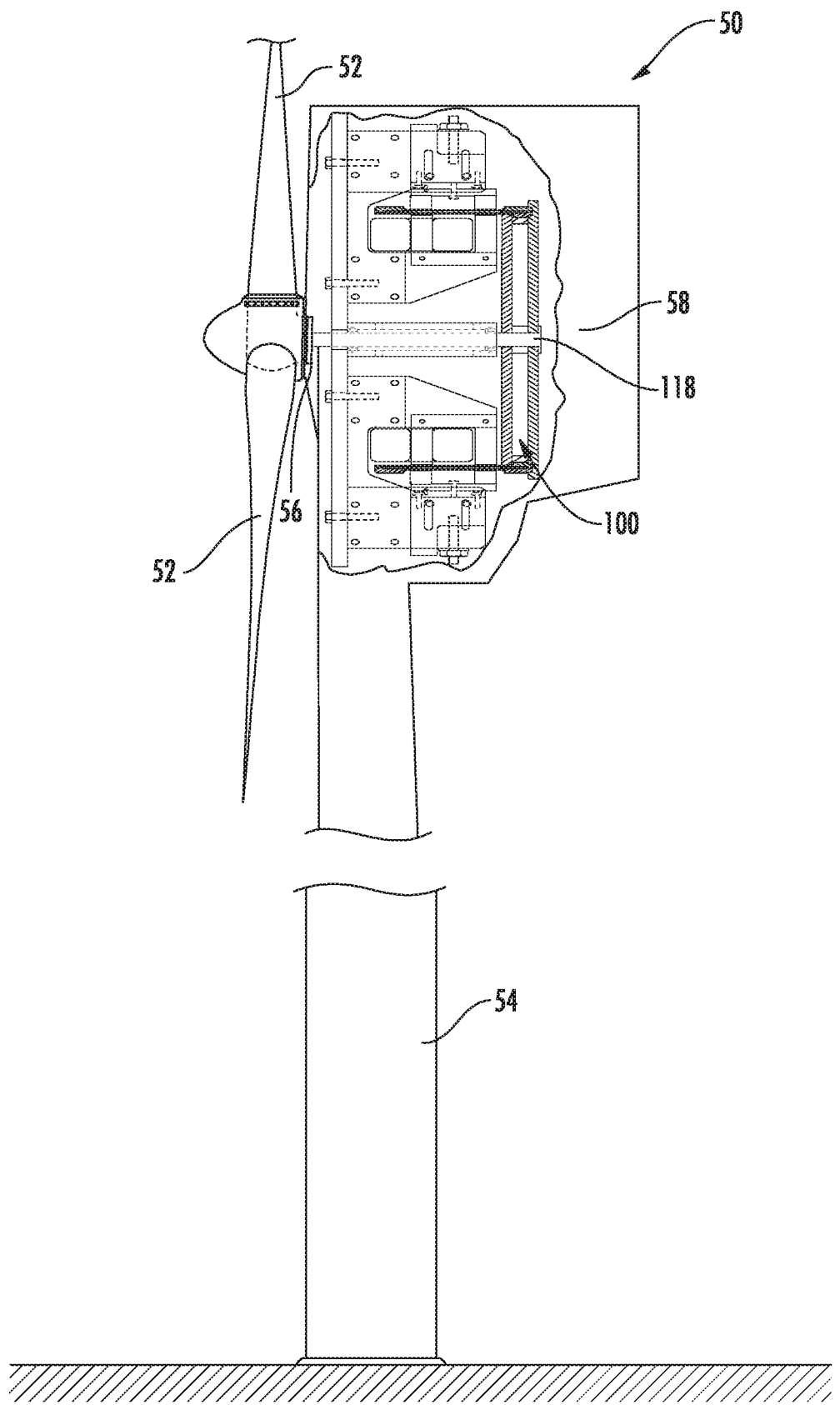
FIG. 1 is a partial cutout perspective view of a wind generator assembly constructed according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting.

In the following detailed description of embodiments of the disclosure, numerous specific details are set forth in order to provide a more thorough understanding of the inventive concepts disclosed herein. However, it will be apparent to one of ordinary skill in the art that the inventive concepts within the disclosure may be practiced without these specific details. In other instances, well-known features have not been described in detail to avoid unnecessarily complicating the description.

As used herein the notation "a-n" appended to a reference numeral is intended as merely convenient shorthand to reference one, or more than one, and up to infinity, of the element or feature identified by the respective reference numeral (e.g., 100*a-n*). Similarly, a letter following a reference numeral is intended to reference an embodiment of the feature or element that may be similar, but not necessarily identical, to a previously described element or feature bearing the same reference numeral (e.g., 100, 100*a*, 100*b*, etc.). Such shorthand notations are used for purposes of clarity and convenience only, and should not be construed to limit the inventive concepts disclosed herein in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

As used herein the terms "axial," "axially," and any variations thereof, are intended to include extending substantially parallel to, or along the same line as, an axis of rotation.

As used herein the terms "air gap," "gap," and any variations thereof shall be understood to include a distance separating two or more objects or surfaces, regardless of whether a gas or fluid is between the objects or surfaces, unless expressly stated to the contrary.

Further, as used herein the terms "radial," "radially," and any variations thereof are intended to include extending along a radius, or a line substantially perpendicular to an axis of rotation.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are directed to a generator of electrical energy. Broadly, the generator comprises one or more pairs of radially oriented and concentrically disposed opposing stationary pairs of magnetic field sources and coils separated by an axial air gap. An interference drum is disposed in the air gap separating the magnetic field sources and the coils, the interference drum having alternating magnetic field permeable zones and magnetic field impermeable zones along an axial surface thereof. When the interference drum is rotated, the magnetic field between the static magnetic field sources and the static coils is alternatively allowed to reach the coils, or redirected away from the coils by the alternating zones of the interference drum assembly. The resulting radial flux induces electrical current in the coils.

Referring now to the drawings and in particular to FIG. 1, a wind generator turbine 50 is shown as having a support assembly 54, one or more blades 52, a shaft 56, a generator assembly housing 58, and a generator assembly 100. The generator assembly 100 is shown through a partial cutout of the generator assembly housing 58. The generator assembly housing 58 is connected to the support assembly 54. The generator assembly housing 58 may also be referred to as a nacelle. The generator assembly 100 is positioned within the generator assembly housing 58, and the shaft 56 may connect the blades 52 to the generator assembly 100.

Figure 2:
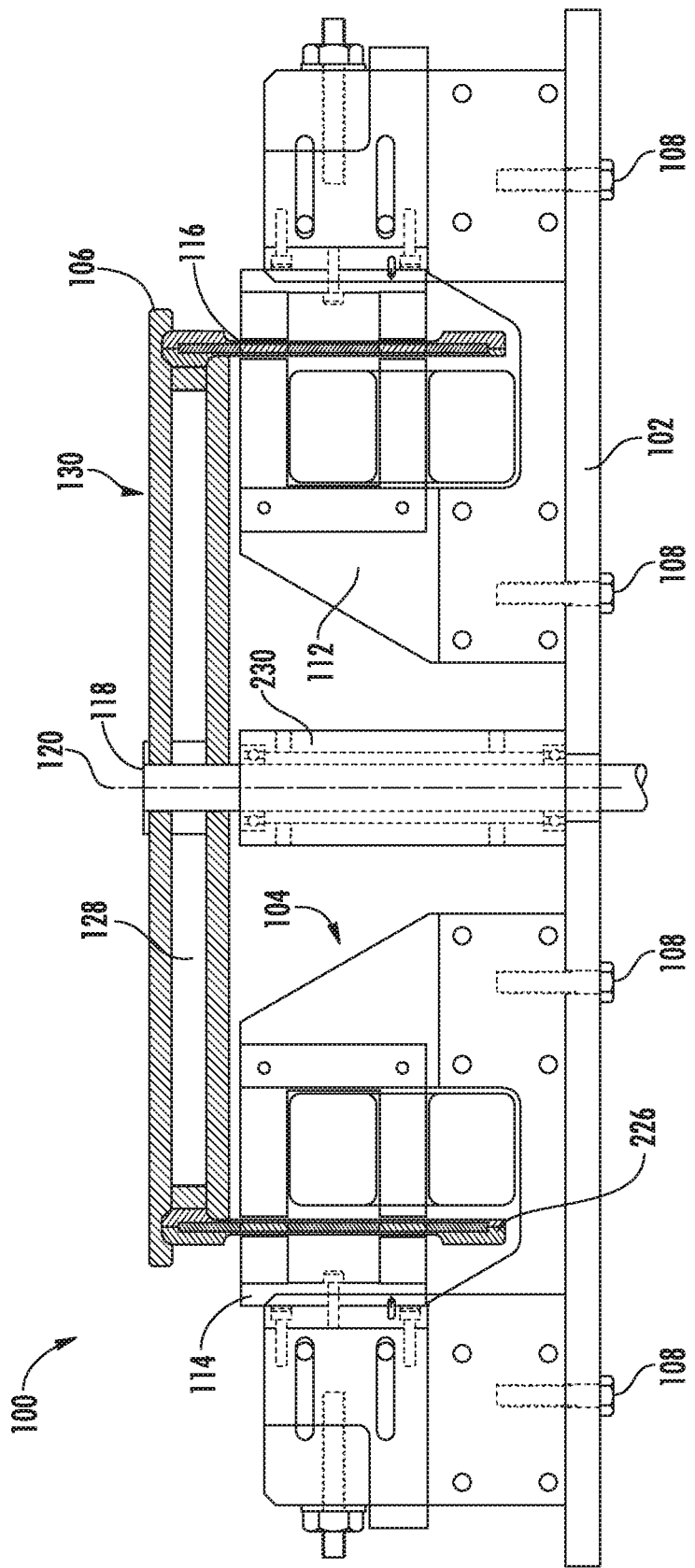
FIG. 2 is a side view showing an embodiment of a generator of electrical energy according to the inventive concepts disclosed herein, with a cross-section of the interference drum shown for clarity.
Figure 3:
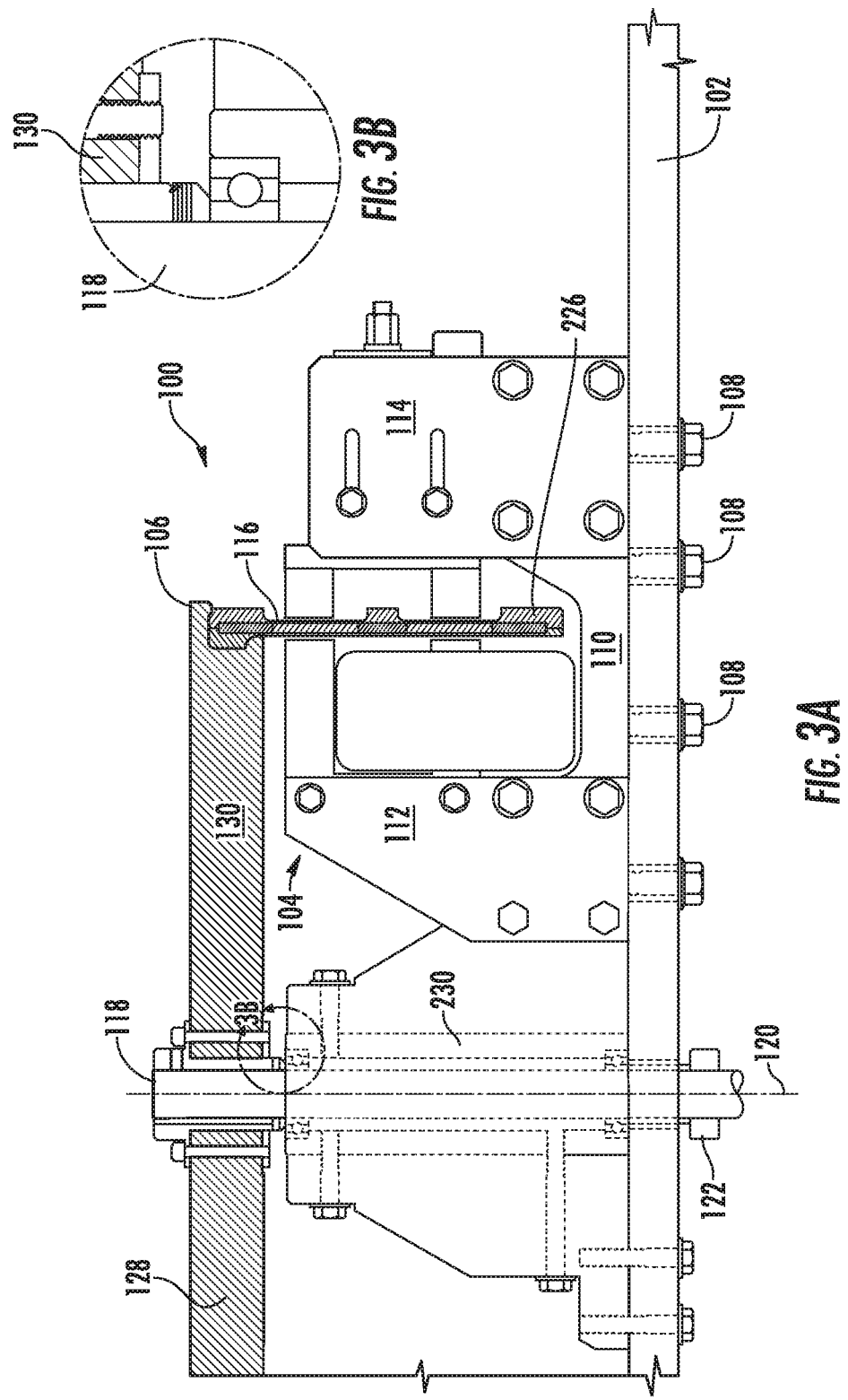
FIG. 3A is a side view of the generator of electrical energy shown in FIG. 2.
FIG. 3B is a fragmental detail view along line 3B of FIG. 3A.

Referring now to FIGS. 2-3B, the generator assembly 100 comprises a base plate 102, one or more flux assemblies 104a and 104b (two being shown for clarity), and an interference drum assembly 106. For the purposes of clarity, the base plate 102 shall be arbitrarily referenced hereinafter as oriented horizontally, and the orientations of the flux assemblies 104a and 104b and interference drum assembly 106 shall be discussed relative to a horizontally oriented base plate 102. It is to be understood however, that such orientation designations refer only to the orientation of the various components of the generator assembly 100 one relative to another, and do not necessarily relate to any external object, direction, or orientation. Such designations are made for purposes of clarity and convenience only, and are not to be regarded as limiting the inventive concepts disclosed herein in any way.

Figure 4:
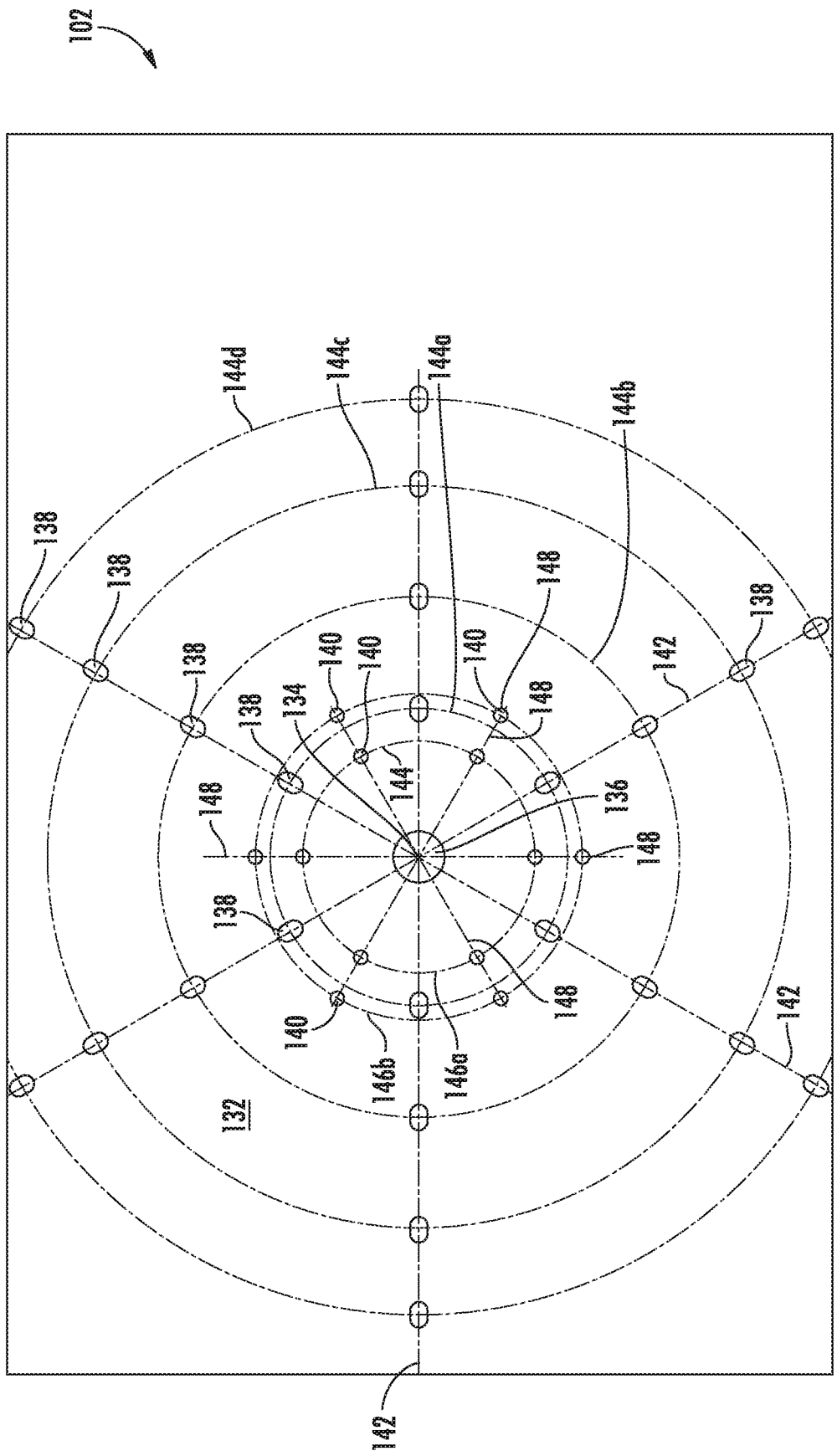
FIG. 4 is a top plan view of a base plate of the generator shown in FIG. 2.

The base plate 102 preferably defines a substantially horizontal disk-shaped flat surface (132, FIG. 4) having a center (134, FIG. 4). The flux assemblies 104a and 104b and the interference drum assembly 106 can be mounted onto the base plate 102 via base bolts 108, although other mounting methods can be used. The flux assemblies 104a and 104b preferably extend substantially vertically from the base plate 102. The flux assemblies 104a and 104b are substantially identical in configuration and function so only the flux assembly 104a will be described hereinafter. The flux assembly 104a comprises a flux base 110, a coil assembly 112, and a magnet assembly 114. The coil assembly 112 and the magnet assembly 114 are preferably mounted onto the flux base 110, and are disposed opposite to one another. The coil assembly 112 and magnet assembly 114 are preferably arranged in a radial orientation relative to the center of the base plate 102, and are preferably separated by an axial annular air gap 116, in which the interference drum assembly 106 is preferably at least partially disposed. While the coil assembly 112 is shown as being closer to the center 134 of the base plate 102 than the magnet assembly 114, it is to be understood that alternatively the magnet assembly 114 can be disposed closer to the center 134 of the base plate 102 than the coil assembly 112.

The generator assembly 100 may comprise six flux assemblies 104a mounted onto the base plate 102 such that the flux assemblies 104a are symmetrically disposed about the disk-shaped surface 132 (FIG. 4) defined by the base plate 102. The distance between any two of the six flux assemblies 104a is preferably equal to the distance between any other two flux assemblies 104a, resulting in the six flux assemblies 104a being separated by 60° along the disk-shaped surface 132 (FIG. 4) of the base plate 102 and extending radially from the center 134 (FIG. 4) thereof. It is to be understood, however, that a different number of flux assemblies 104a can be used with the inventive concepts disclosed herein without departing from the scope of the present disclosure.

The interference drum assembly 106 preferably extends substantially vertically from the base plate 102. The interference drum assembly 106 comprises a shaft 118, a shaft housing 230, a hub assembly 128, and a drum 226. The shaft 118 has a central axis 120, and preferably extends substantially perpendicularly to the base plate 102 through the center 134 of the base plate 102. The end of the shaft 118 extending below the base plate 102 can be retained by a shaft collar 122 (see FIG. 3A), for example. The shaft 118 can be substantially cylindrical in shape and can be made from any suitable material having sufficient strength and durability, and preferably non-conductive and/or non-ferrous materials to limit the potential of eddy currents being induced within the generator assembly 100 can be used. The shaft 118 connects to the hub assembly 128 using any suitable arrangement. The hub assembly 128 preferably comprises a substantially cylindrical hub 130, or can comprise one, two, or more spokes (not shown) connecting the shaft 118 and the drum 226. The hub 130 is preferably substantially parallel to the surface 132 of the base plate 102. The hub 130 connects to the shaft 118. The hub 130 can be made from any suitable material with the desired strength and durability, and preferably non-conductive and/or non-ferrous materials to limit the potential of eddy currents being induced within the generator assembly 100.

The drum 226 preferably has a substantially cylindrical sidewall 276. The drum 226 is connected to the hub 130. The drum 226 is preferably substantially perpendicular to the base plate 102 and is adapted to rotate around the center 134 of the base plate 102 when the shaft 118 is rotated about the central axis 120. The drum 226 is at least partially disposed inside the air gap 116 between the coil assembly 112 and the magnet assembly 114. The drum 226 can be manufactured as will be described below with reference to FIGS. 16-26.

Referring now to FIG. 4, the base plate 102 can be of any suitable shape, and preferably defines a substantially disk-shaped surface 132 which is substantially flat. The surface 132 has a center 134, an aperture 136 preferably located at the center 134, a first set of apertures 138, and a second set of apertures 140. Only some of the apertures 138 and 140 are referenced in FIG. 4, for purposes of clarity.

The first set of apertures 138 are arranged along the surface 132 in such a way as to define four concentric rings 144a-d of proportionately increasing radius, and are aligned as to form six radial lines 142 separated by about 60°.

The second set of apertures 140 can be arranged along the surface 132 in such a way as to define two concentric rings—146a-b, and arranged to form six radial lines 148, which are preferably offset by about 30° from the radial lines 142 defined by the first set of apertures 138. The apertures 138 can be adapted to receive the base bolts 108, in order to affix the interference drum assembly 106 and the flux assembly 104a to the base plate 102. The base plate 102 can be made from a thermoset plastic laminate material such as a material of the type sold under the name Garolite G-10, but acrylic plastics such as Plexiglas™, or any other material of suitable strength and durability can be used. The base plate 102 is preferably made of non-conductive and/or non-ferrous materials to limit the potential of eddy currents being induced within the generator assembly 100. The disk-shaped surface 132 of the base plate 102 can be preferably about 24 inches in diameter, but it is to be understood that the dimensions of the base plate 102 can be varied depending on the material used for the manufacture of the base plate 102 and/or the operational and environmental variables expected to be encountered by the generator assembly 100.

The base plate 102 can function to structurally support the various components of the generator assembly 100. The shape, size, organization, and number of apertures 138 and 140 can vary. The aperture 136 is adapted to receive the shaft 118 therethrough. The base plate 102 can define a part of an external housing (not shown) protecting the generator assembly 100 from environmental variables. Alternatively, the generator assembly 100 can be completely or partially enclosed by a separate protective housing, such as the generator assembly housing 58 shown in FIG. 1, for example. It should be understood that the base plate 102 can have any size or shape, as long as it allows for the concentric radial orientation of the interference drum assembly 106, the magnet assembly 114, and the coil assembly 112 along the surface 132 of the base plate 102.

Referring now to FIGS. 5A-5B, the flux base 110 is preferably made from a thermoset plastic laminate material, such as a material of the type sold under the name Garolite G-10, but any material of suitable strength and durability can be used. The flux base 110 is preferably made of non-conductive and/or non-ferrous materials to limit the potential of eddy currents being induced within the generator assembly 100. The flux base 110 is preferably about 1 inch thick, but it is to be understood that the dimensions of the flux base 110 can be varied depending on the material used for its manufacture and/or the operational and environmental variables expected to be encountered by the generator assembly 100.

The flux base 110 preferably has an elongated shape, a first end 150, a second end 152, a notched middle portion 154, and a bottom 156. The bottom 156 preferably has four base apertures 158 adapted to threadingly receive four base bolts 108 therein, in order to mount the flux base 110 onto the base plate 102. The bottom 156 of the flux base 110 may have a substantially flat rectangular surface to ensure that the flux base 110 fits flush with the surface 132 of the base plate 102, such that the flux base 110 is extending substantially vertically from the surface 132 of the base plate 102 although other configurations can be used. It is to be understood that the flux base 110 can be attached to the surface 132 by any suitable means known in the art, such as screws, rivets, welds, adhesives, and combinations thereof, for example. Alternatively, the flux base 110 and the base plate 102 maybe formed as a single piece, or another element (not shown) may be used to connect the flux base 110 to the base plate 102. The flux base 110 may also have mounting apertures 160 cut or otherwise formed into the flat surfaces of its first end 150 and its second end 152. The apertures 160 are preferably arranged in a substantially rectangular orientation, and are substantially perpendicular relative to the base apertures 158. The apertures 160 function to allow for the attachment of the magnet assembly 114 and the coil assembly 112 to the flux base 110.

Figure 6:
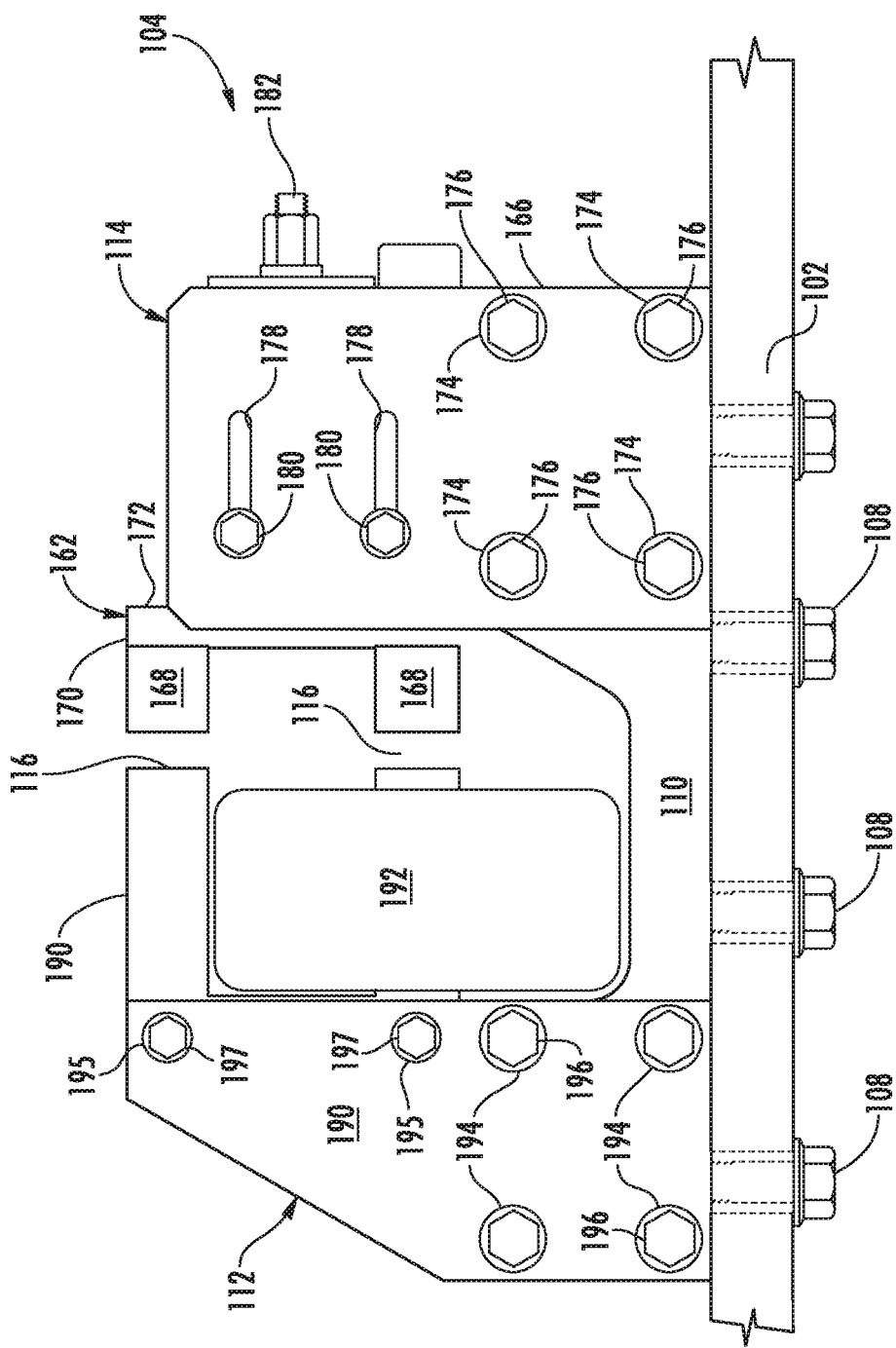
FIG. 6 is a side view of a flux assembly on the generator shown in FIG. 2.

Referring now to FIG. 6, the flux assembly 104a comprises a coil assembly 112, and a magnet assembly 114.

The coil assembly 112 has a coil mount 190, and a coil 192. The coil 192 can have two mounting apertures 195 used to mount the coil 192 onto the coil mount 190. The coil mount 190 has apertures 194 adapted to substantially align with the apertures 160 of the flux base 110. The coil mount 190 can be mounted onto the flux base 110 by inserting bolts 196 through apertures 194 and mounting apertures 160. The coil mount 190 may also have two mounting apertures 195 cut or otherwise formed therein, the mounting apertures 195 adapted to correspond with mounting apertures 160, and receive bolts 197 to secure the coil 192 to the coil mount 190. The coil 192 can be any conventional coil 192 and can have any type or number of windings, cores, and/or poles, as long as the coil 192 is capable of receiving a magnetic flux from the magnet 172, such that electrons from the coil 192 are forced to flow through an electrical circuit (not shown) which may be external to the coil 192.

Figure 7:
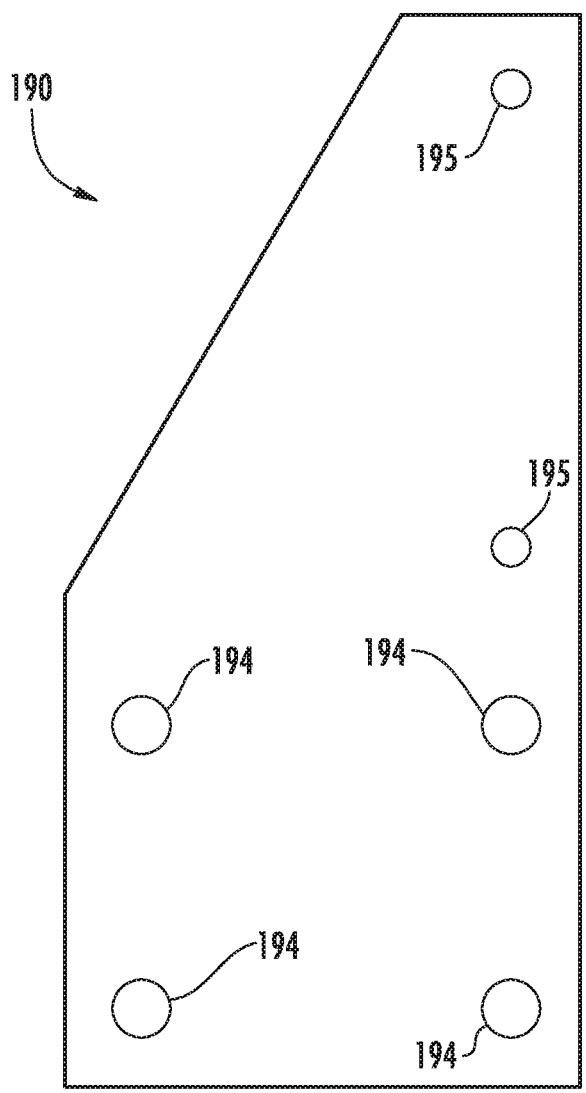
FIG. 7 is a side view of a coil mount of the generator shown in FIG. 2.
Figure 8:
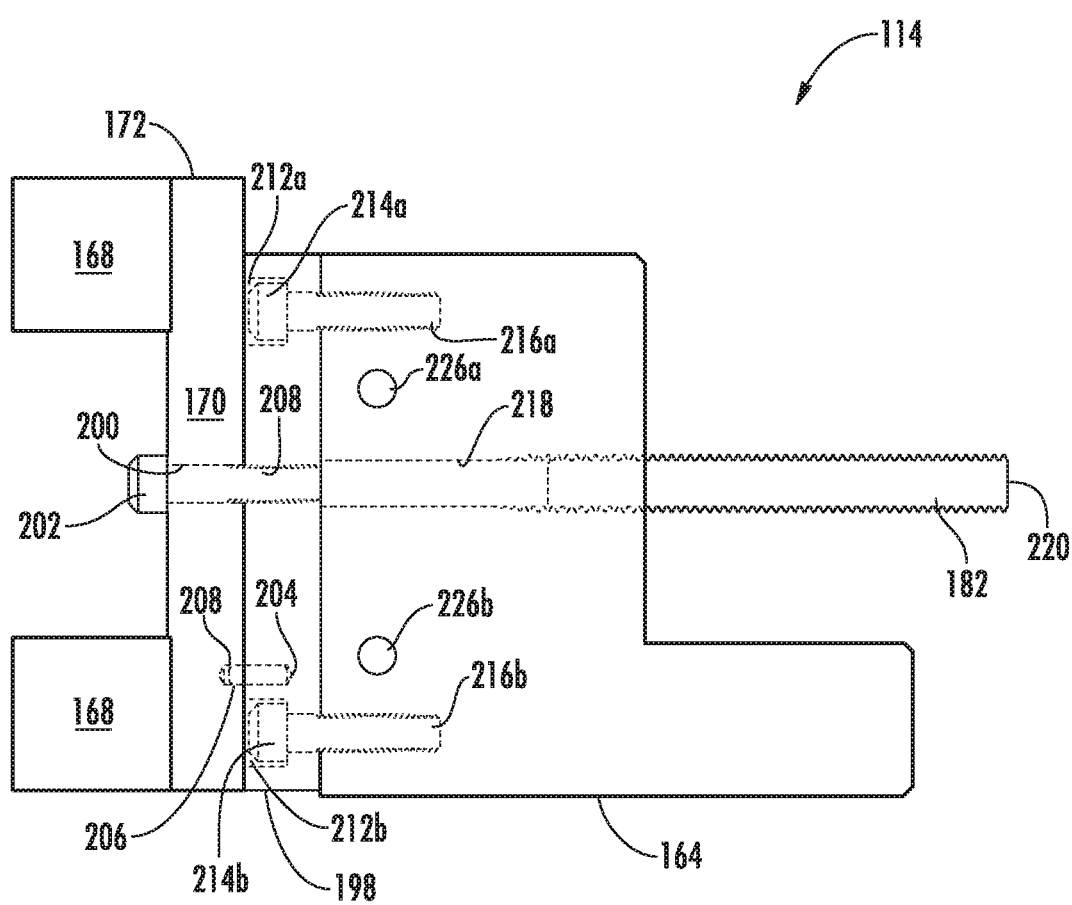
FIG. 8 is a side view of a magnet assembly of the generator shown in FIG. 2.

Referring now to FIG. 7, the coil mount 190 is preferably about 0.5 inches thick, but it is to be understood that the dimensions of the coil mount 190 can be varied depending on the material used for its manufacture and/or the operational and environmental variables expected to be encountered by the generator assembly 100. The coil mount 190 functions to structurally attach the coil assembly 112 to the flux base 110 via the apertures 194. The coil mount 190 can be directly attached to the flux base 110 via bolts, nuts, screws, welds, adhesives, or by any other suitable means, for example. The coil mount 190 can be preferably made from a material of the type sold under the name Garolite G-10, but any material of suitable strength and durability, and preferably non-conductive and/or non-ferrous materials to limit the potential of eddy currents being induced within the generator assembly 100, can be used. The coil mount 190 can mount onto the flux base 110 in a fixed position. Alternatively, the coil mount 190 can mount onto the flux base 110 in an adjustable position, by using slots which allow the coil mount 190 to slide relative to the flux base 110, for example.

Referring now to FIGS. 8-11, the magnet assembly 114 preferably has a magnet 162, a magnet slide 164, a magnet mount 166, and an optional magnet bracket 198.

The magnet 162 preferably comprises a pair of magnets 168, connected with a magnetically-conductive bar 170, such that they form a unitary magnet 172. The magnets 168 can be any magnets, can be made of any suitable material, and can be isotropic or anisotropic and combinations thereof. The magnets 168 can be of any strength, and can have varying sizes and shapes depending on the size and output requirements of the generator assembly 100. The magnets 168 can be arranged in any configuration consistent with defining as least a part of an air gap 116 between the magnet assembly 114 and the coil assembly 112, and preferably being in magnetic communication with the coil assembly 112. The magnets 168 may be permanent magnets, electromagnets, and combinations thereof. The pair of magnets 168 are preferably connected via a bar 170, such that a unitary magnet 172 is formed. The bar 170 is preferably made of steel, but can be made of any suitable material so long as it functions to connect the two magnets 168 into a unitary magnet 172. Alternatively, the magnet 172 can comprise a single magnet (not shown). The bar 170 can have a central aperture 200 formed therethrough, the central aperture 200 adapted to receive a bolt 202. The bar 170 also may have a dowel pin aperture 204 adapted to partially receive a dowel pin 206.

Referring now to FIGS. 9A-9B, the magnet assembly 114 further comprises a magnet slide 164, to which the optional magnet bracket 198 can be attached via bolts 214a and 214b, or by other suitable means as will be described below. The magnet slide 164 preferably has two apertures 216a and 216b formed therethrough, the apertures 216a and 216b preferably having threads formed therein. The apertures 216a and 216b can be adapted to receive bolts 214a and 214b in order to secure the magnet bracket 198 to the magnet slide 164. The magnet slide 164 also preferably has a central aperture 218 cut or otherwise formed therethrough. The central aperture 218 is adapted to receive any portion of a bolt 202 which extends beyond the magnet bracket 198 as will be described below. The central aperture 218 may also be designed to receive and retain therein the slide adjustment rod 182. The slide adjustment rod 182 is preferably made of an acrylic plastic material such as Plexiglas™ for example, or any material of suitable strength and durability, and preferably non-conductive and/or non-ferrous materials to limit the potential of eddy currents being induced within the generator assembly 100, can be used. The slide adjustment rod 182 can be secured inside the central aperture 218 by the use of epoxy, epoxy resins, or other suitable adhesives, for example. The slide adjustment rod 182 preferably has a threaded end 220 which extends at least partially laterally from the magnet mount 166, such that a slide adjustment washer 222 and adjustment nut 224 can be attached to the threaded end 220 of the slide adjustment rod 182. The slide adjustment washer 222 can rest against the magnet bracket 198. A spring (not shown) may be inserted over the slide adjustment rod 182, or any other suitable means may be used to keep the slide adjustment washer 222 pressed against the magnet bracket 198. The magnet slide 164 may also have two or more apertures 226a and 226b formed therethrough, which apertures 226a and 226b are preferably substantially perpendicular to the apertures 216a and 216b.

The magnet slide 164 is preferably made of 1 inch thick thermoset plastic laminate material such as the material sold under the name Garolite G-10, but acrylic plastics such as Plexiglas™, epoxy resins, or any material of suitable strength and durability, and preferably non-conductive and/or non-ferrous materials to limit the potential of eddy currents being induced within the generator assembly 100, can be used. Additionally, the magnet slide 164 can have any suitable thickness, size, or shape, so long as the magnet slide 164 is capable of supporting the magnet 172, and is preferably capable of slidably adjusting the position of magnet 172 relative to the flux base 110 and the coil assembly 112, in order to adjust the size of the air gap 116. The magnet slide 164 can be mounted onto the flux base 110 by inserting lockdown bolts 180 through the adjustment slots 178a and 178b of the magnet mount 166 and into apertures 226a and 226b respectively. The position of the magnet slide 164 can be adjusted by tightening or loosening the adjustment nut 224, which results in the sliding of the lockdown bolts 180 into the adjustment slots 178a and 178b, in order to move the magnet slide 164 relative to the magnet mount 166, and thereby the flux base 110 and the coil assembly 112. To secure the magnet slide 164 in position, the lockdown bolts 180 can be tightened.

Figures 10A, 10B:
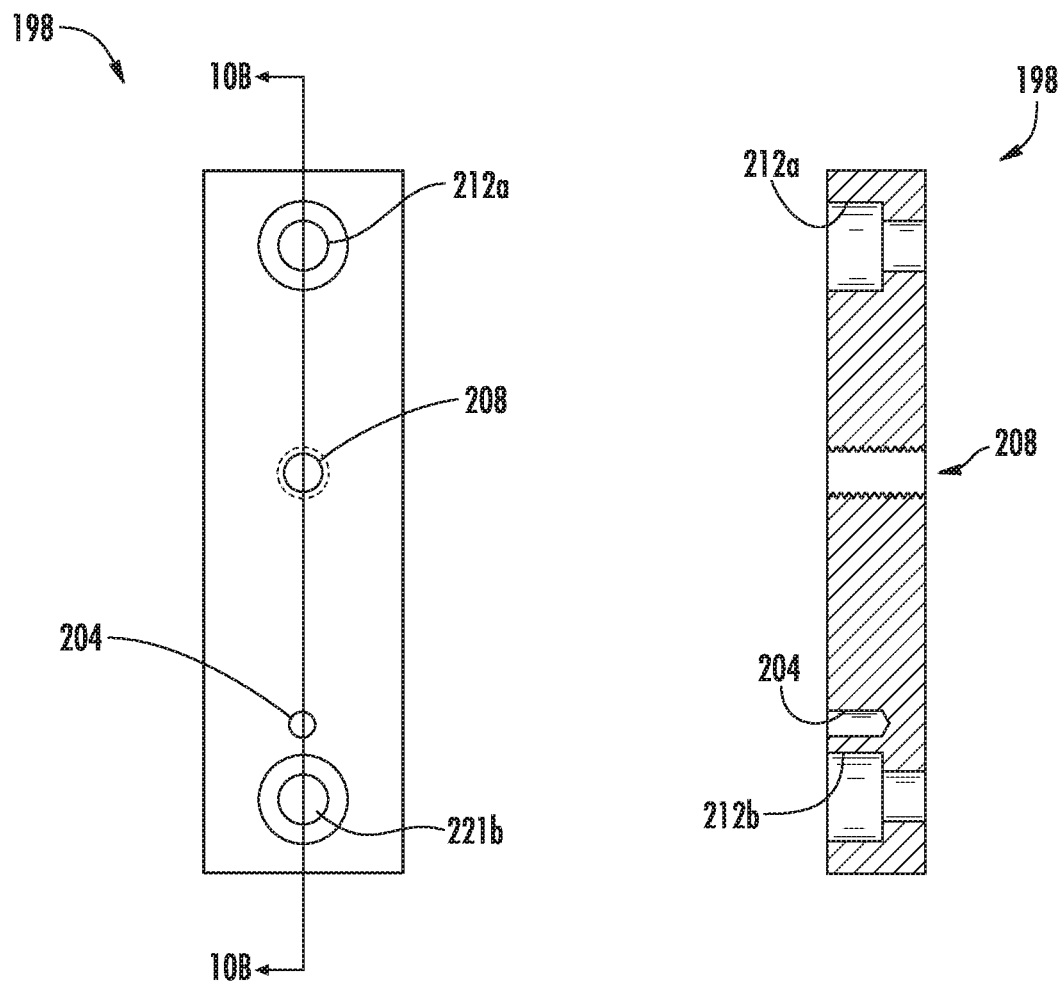
FIG. 10A is a front view of a magnet bracket of the magnet assembly shown in FIG. 8.
FIG. 10B is a cross-sectional view taken along line 10B-10B of FIG. 10A.

Referring now to FIGS. 10A-10B, the optional magnet bracket 198 can be substantially rectangular in shape and may have substantially flat surfaces. The magnet bracket 198 can have two mounting apertures 212a and 212b, a central aperture 208, and a dowel pin aperture 204. The dowel pin aperture 204 may be adapted to at least partially receive the dowel pin 206, such that the dowel pin 206 and the bolt 202 engage the magnet 172 and the magnet bracket 198, in order to prevent rotation of the magnet 172 and the magnet bracket 198 relative to one another. It is to be understood, however, that any other suitable means can be used to secure the magnet 172 and the magnet bracket 198 together, such as a plurality of dowel pins, a plurality of bolts, one or more of: screws, rivets, welds, or adhesives, for example. The magnet bracket 198 also preferably has a lateral pair of apertures 212a and 212b cut or otherwise formed therethrough, the apertures 212a and 212b can be adapted to receive bolts 214a and 214b respectively. The magnet bracket 198 is preferably made of aluminum, but it is to be understood than any material of suitable strength and durability, and preferably non-conductive and/or non-ferrous materials to limit the potential of eddy currents being induced within the generator assembly 100 can be used. The magnet bracket 198 can have various shapes and sizes as long as it functions to connect the magnet 172 to the magnet slide 164. Alternatively, a magnet bracket 198 can be omitted, and the magnet 172 can be directly connected to the magnet slide 164.

Figure 11:
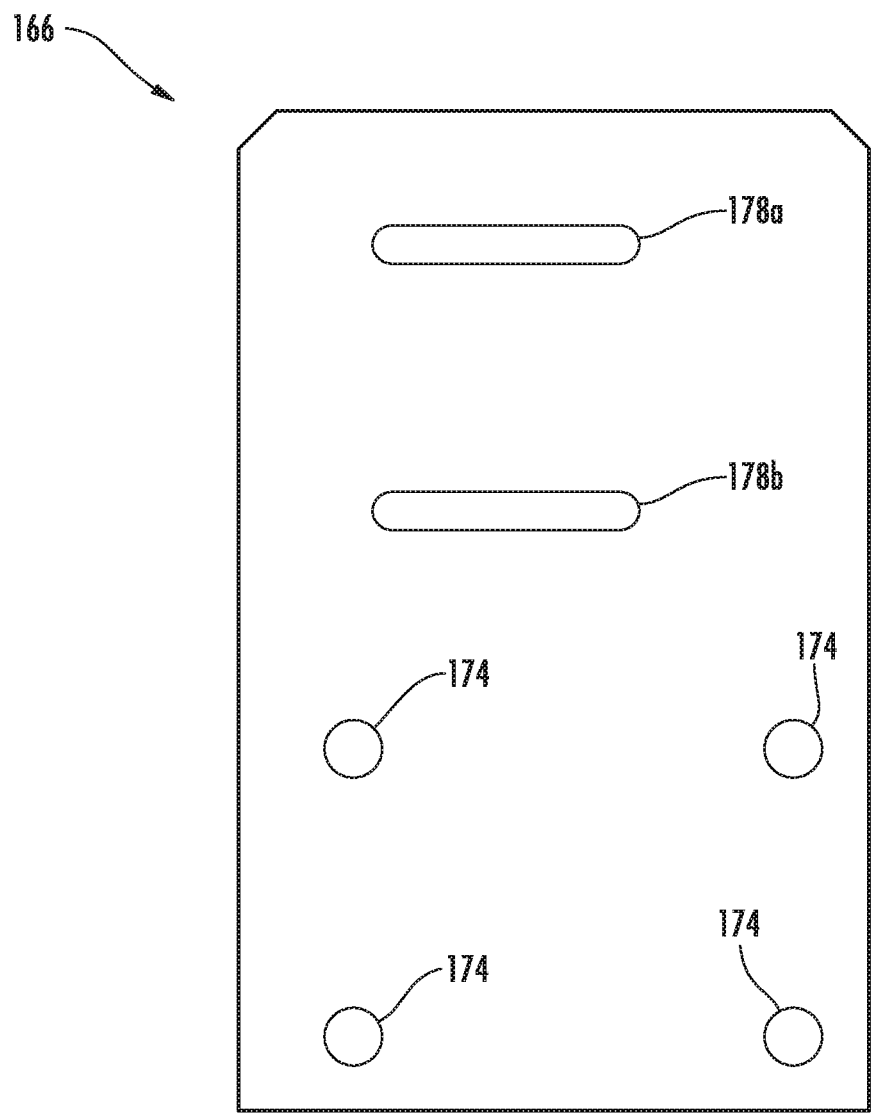
FIG. 11 is a front view of a magnet mount of the magnet assembly shown in FIG. 8.
Figure 12:
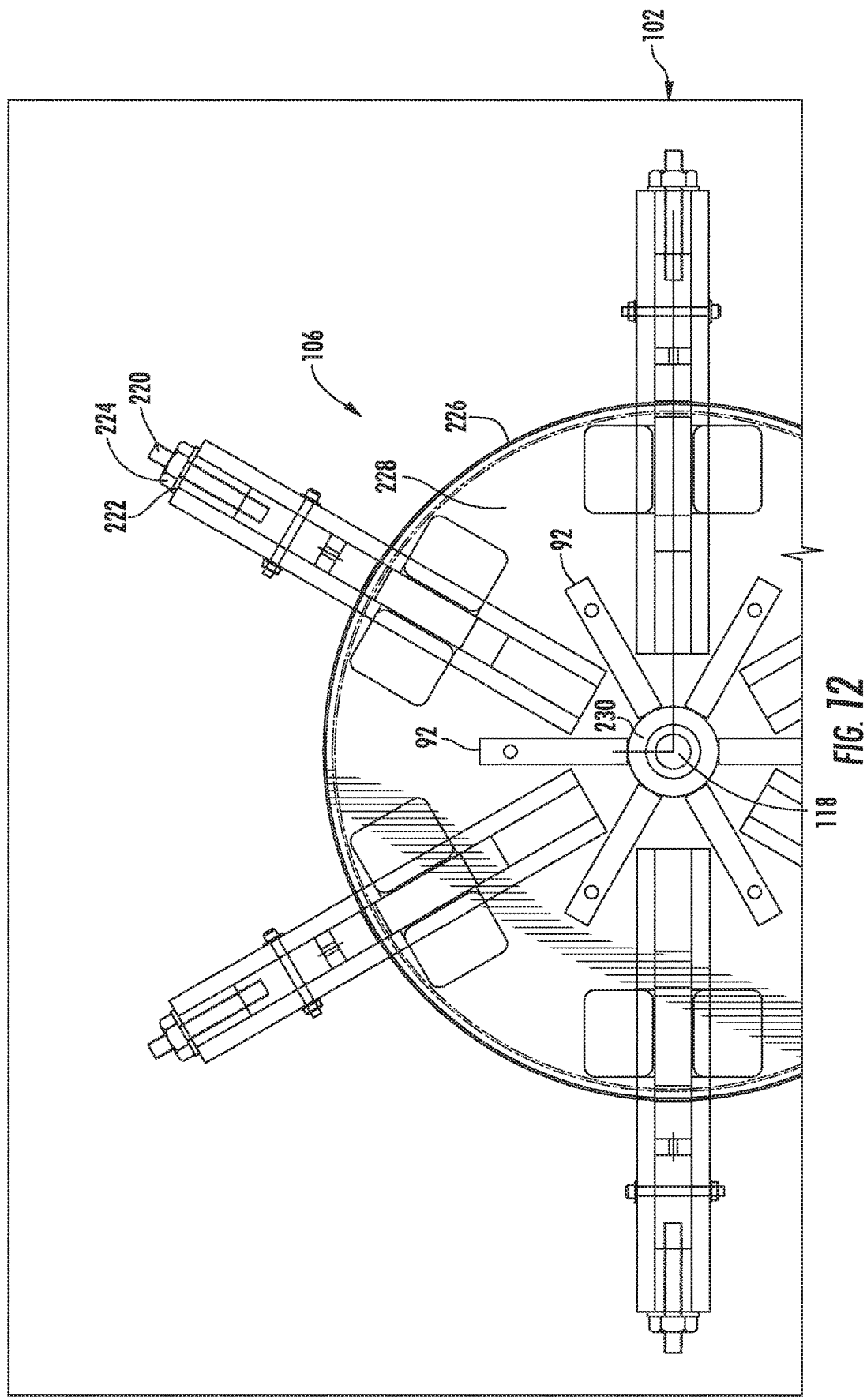
FIG. 12 is a top view of the generator shown in FIG. 2.
Figure 13B:
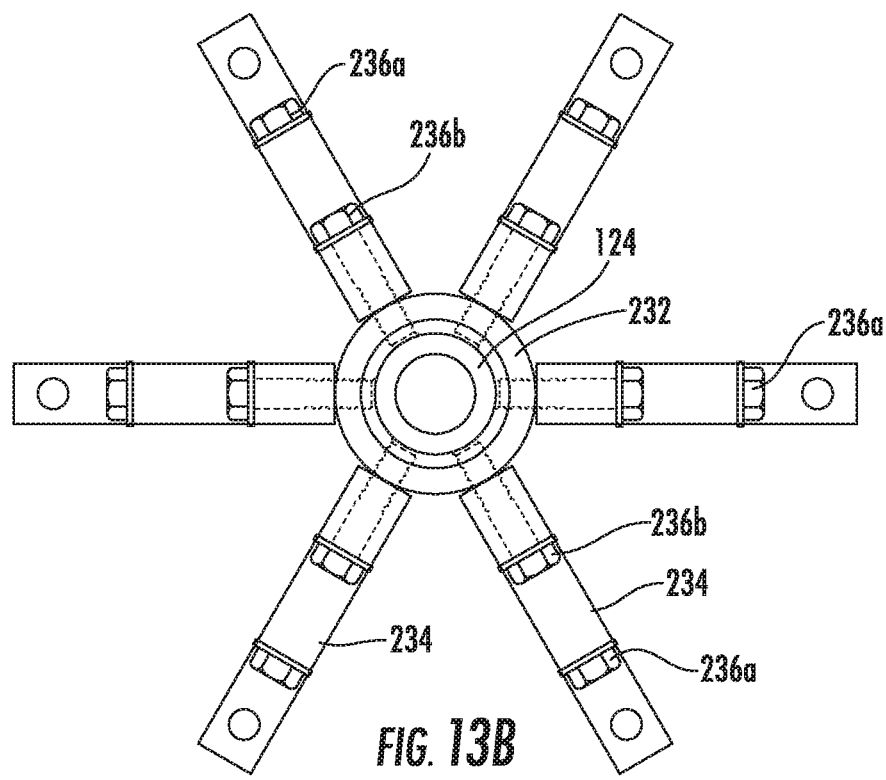
FIG. 13B is a top plan view of the shaft support assembly shown in FIG. 13A.
Figure 13A:
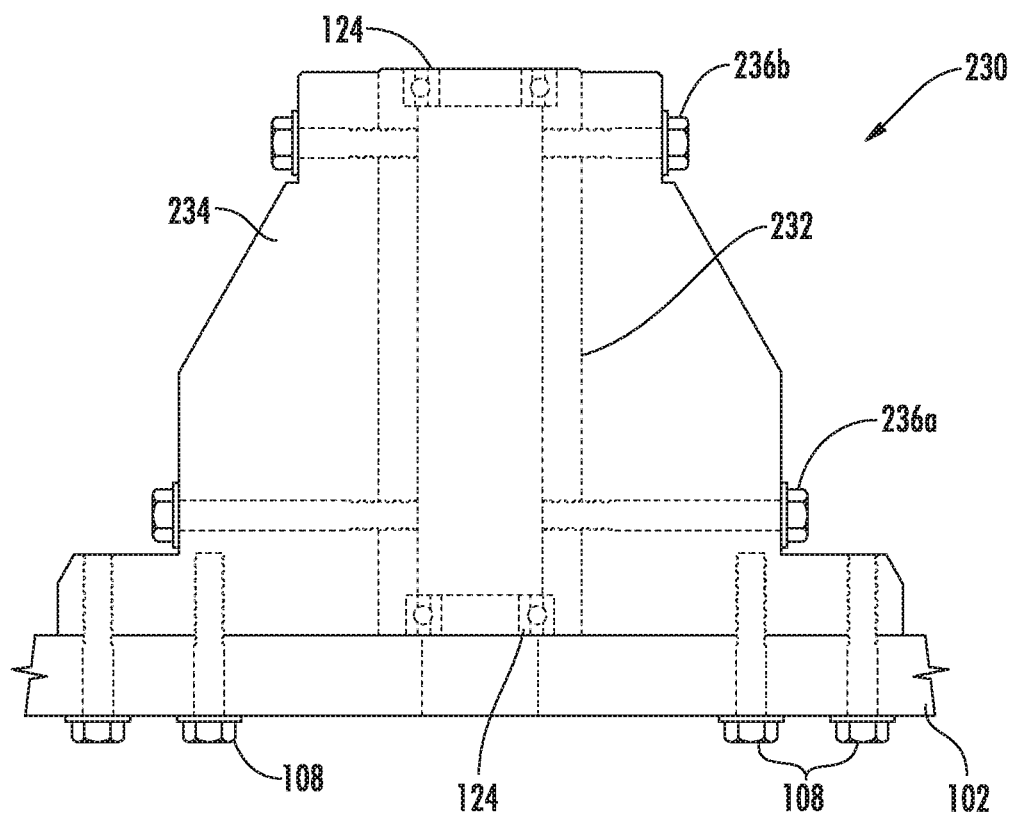
FIG. 13A is a side view of a shaft support assembly of the generator shown in FIG. 2.

Referring now to FIG. 11, the magnet mount 166 is preferably substantially rectangular in shape and is preferably made of a thermoset plastic laminate material such as a material of the type sold under the name Garolite G-10, but acrylic plastics such as Plexiglas™, epoxy resins, or any material of suitable strength and durability, and preferably non-conductive and/or non-ferrous materials to limit the potential of eddy currents being induced within the generator assembly 100 can be used. The magnet mount 166 may have four or more mounting apertures 174 which are spaced to substantially align with mounting apertures 160 of the flux base 110. The magnet mount 166 may mount onto the flux base 110 by inserting bolts (not shown) through the corresponding mounting apertures 174 and mounting apertures 160. The magnet mount 166 may also have two adjustment slots 178a and 178b cut therein. The adjustment slots 178a and 178b can correspond to apertures 212a and 212b of the magnet slide 164. The adjustment slots 178a and 178b may function to allow lockdown bolts 180 (not shown) to be inserted through the adjustment slots 178a and 178b and the apertures 212a and 212b, and allow the lockdown bolts 180 to slide inside the adjustment slots 178a and 178b, in order for the magnet slide 164 to be slidably adjustable relative to the magnet mount 166. As the coil assembly 112 is mounted on the flux base 110, the magnet slide 164 is mounted onto the magnet mount 166, and the size of the air gap 116 can be adjusted by sliding the magnet slide 164 relative to the magnet mount 166. Once the magnet slide 164 is in the desired position, the magnet slide 164 can be secured by tightening the lockdown bolts 180.

Referring now to FIGS. 12-14C, the interference drum assembly 106 may have a shaft 118, a cylindrical drum 226, and a hub 130 connecting the drum 226 to the shaft 118, so as to allow the drum 226 to rotate when the shaft 118 is rotated. The shaft 118 can be housed inside a shaft housing 230, which may be mounted onto the base plate 102. The shaft housing 230 may comprise a bearing tube 232, shaft bearings 124, a gusset 234, long gusset bolts 236a, and short gusset bolts 236b. The shaft housing 230 is preferably mounted onto the base plate 102 via base bolts 108, such that the shaft housing 230 is substantially centered over the central aperture 136 of the base plate 102, and the shaft 118 extends through the central aperture 136 of the base plate 102. The bearing tube 232 can be substantially cylindrical in shape, and may have a first row of apertures 240a and a second vertically offset set of apertures 240b cut or otherwise formed therethrough. The apertures 240a and 240b have threads formed into them and are adapted to receive long gusset bolts 236a and short gusset bolts 236b therein respectively. The apertures 240*a* and 240*b* can be substantially perpendicular to the longitudinal axis of the bearing tube 232.

The bearing tube 232 may also have two or more annular recesses 246 formed in the bottom and top end thereof. The two annular recesses 246 can be adapted to receive and retain annular shaft bearings 124 therein. The shaft bearings 124 can cooperate with the bearing tube 232 to rotatably secure and house the shaft 118, and ensure smooth rotation of the shaft 118 about its central axis 120. The apertures 240 can be diametrically opposed along the cylindrical surface of the bearing tube 232. The bearing tube 232 is preferably made of a thermoset plastic laminate material such as a material of the type sold under the name Garolite G-10, but acrylic plastics such as Plexiglas™, epoxy resins, or any material of suitable strength and durability, and preferably non-conductive and/or non-ferrous materials to limit the potential of eddy currents being induced within the generator assembly 100 can be used.

Referring now to FIGS. 15A-15C, the gusset 234 can have a bottom surface 250 and a bearing tube surface 252 substantially perpendicular to the surface 132. The bottom surface 250 has two apertures 254 formed therein. The apertures 254 may have threads formed therein, and may be adapted to receive base bolts 108 in order to mount the gusset 234 onto the base plate 102. The bearing tube surface 252 can have two or more apertures 256*a* and 256*b* cut or otherwise formed therein. The apertures 256 can be adapted to receive long gusset bolts 236*a* and short gusset bolts 236*b* respectively therethrough in order to secure the bearing tube 232 to the gusset 234. Several gussets 234 can be secured to the bearing tube 232 in order for the bearing tube surfaces 252 of the gussets 234 to support the bearing tube 232 in a substantially perpendicular orientation relative to the base plate 102.

The number of gussets 234 mounted to the bearing tube 232 can be as low as one, and can be any odd or even number depending on the sizes of the bearing tube 232 and gussets 234. When an even number of gussets 234 is used, the gussets 234 are preferably mounted on the bearing tube 232 in diametrically opposed locations. When an odd number of gussets 234 is used, the gussets 234 are preferably disposed at regular intervals along the cylindrical surface of bearing tube 232, such that the distances between any two gussets 234 is substantially the same as the distance between any other two gussets 234. Alternatively, the gusset 234 can be omitted and the bearing tube 232 can be secured to the base plate 102 by any conventional means known in the art. The bearing tube 232 may be welded to the base plate 102 for example. Alternatively, the bearing tube 232 and the base plate 102 may be formed as a unitary body.

The gusset 234 is preferably made of a thermoset plastic laminate material such as the type of material sold under the name Garolite G-10, but acrylic plastics such as Plexiglas™, epoxy resin, or any material of suitable strength and durability, and preferably non-conductive and/or non-ferrous materials to limit the potential of eddy currents being induced within the generator assembly 100 can be used.

Figure 16:
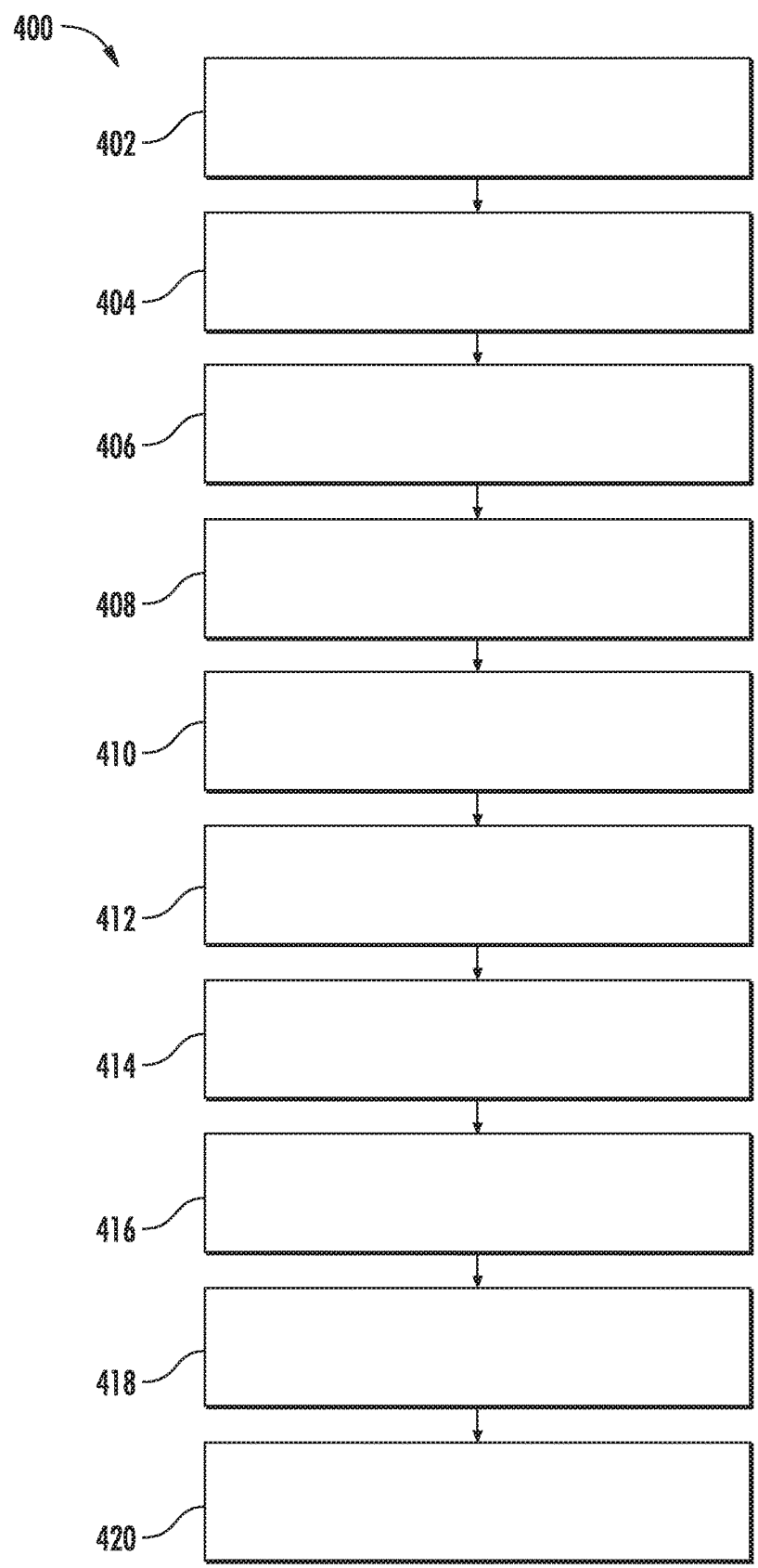
FIG. 16 is a flow diagram of steps of an embodiment of a method for manufacturing an interference drum for a generator of electrical energy according to the inventive concepts disclosed herein.

Referring now to FIG. 16, the preferred method 400 of manufacturing the drum 226 of the generator assembly 100 shown in FIG. 2 comprises steps 402-420, which will be discussed in detail below.

Figure 17A:
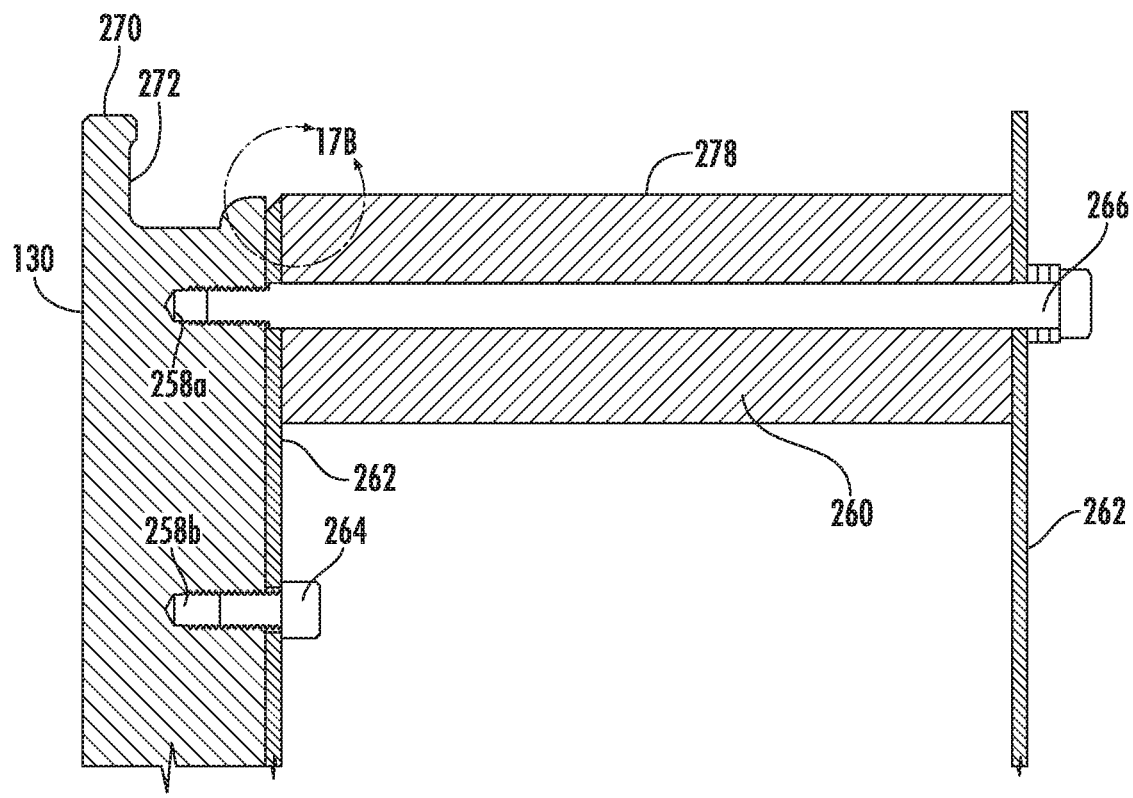
FIG. 17A is a partial cross-sectional view of a mandrel attached to a hub in accordance with step 402 of the flow diagram shown in FIG. 16.
Figure 17B:
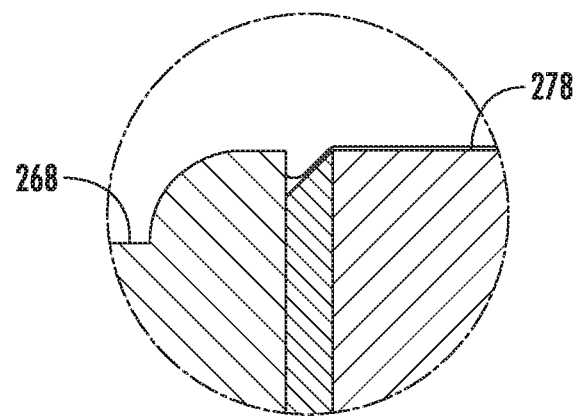
FIG. 17B is a fragmental view along line 17B of FIG. 17A.

Referring now to FIGS. 17A-17B, step 402 comprises attaching a hub 130 to a mandrel 260. The hub 130 is shown as having two apertures 258*a* and 258*b*. The apertures 258*a* and 258*b* preferably have threads formed into them. The mandrel 260 may have two disk-shaped sides 262 attached thereto, and is shown attached to the hub 130 via the insertion of a long bolt 266 and a short bolt 264 into apertures 258*a* and 258*b* respectively. The hub 130 is preferably disk shaped and may have a flat surface 268 and an axial surface 270. An annular recess 272 is preferably formed in the axial surface 270 of the hub 130. The annular recess 272 functions to provide structural support for the various layers of the cylindrical sidewall 276 of the drum 226. The hub 130 can be made of any suitable material, such as a thermoset plastic laminate material such as the type of material sold under the name Garolite G-10, but acrylic plastics such as Plexiglas™, or any material of suitable strength and durability may be used. The hub 130 is preferably made of non-conductive and/or non-ferrous materials to limit the potential of eddy currents being induced within the generator assembly 100. The mandrel 260 preferably has a substantially cylindrical external surface 278.

A mold release agent, or film, is applied onto the surface 278, but not onto the hub 130. The mold release agent, or film, can be any conventional mold release agent or film known in the art, such as wax-based mold release agents, water-based mold release agents, silicone-based mold release agents, Teflon® based mold release agents, and combinations thereof, for example. The mold release agent functions to later separate the finished cylindrical sidewall 276 from the mandrel 260, while at the same time allowing the cylindrical sidewall 276 to remain attached to the hub 130. The mandrel 260 can be made from any material that is able to hold its shape during manufacture, machining, and disassembly/reassembly, such as aircraft-grade aluminum, for example, or other metals, as well as non-metals.

Figure 18B:
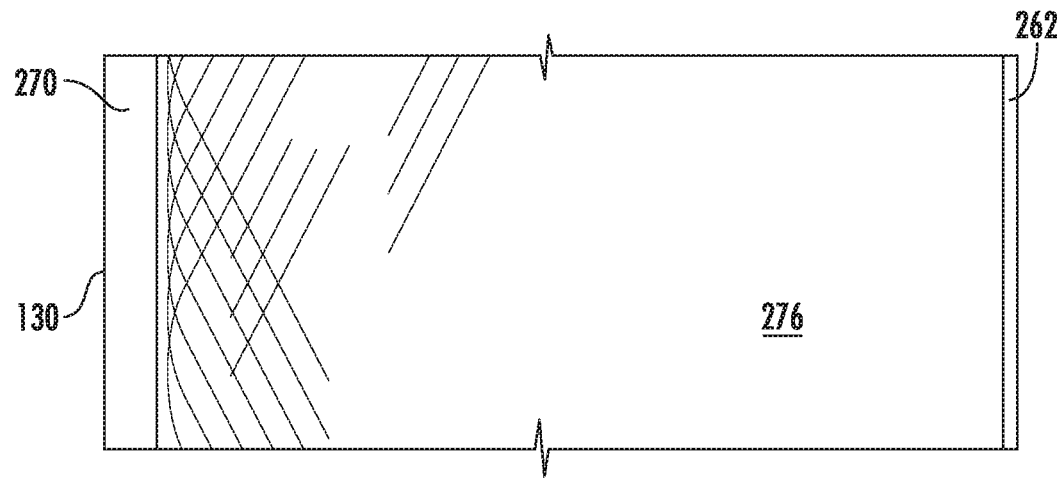
FIG. 18B is a partial top plan of the external axial surface of the first layer of material shown in FIG. 18A.
Figure 18A:
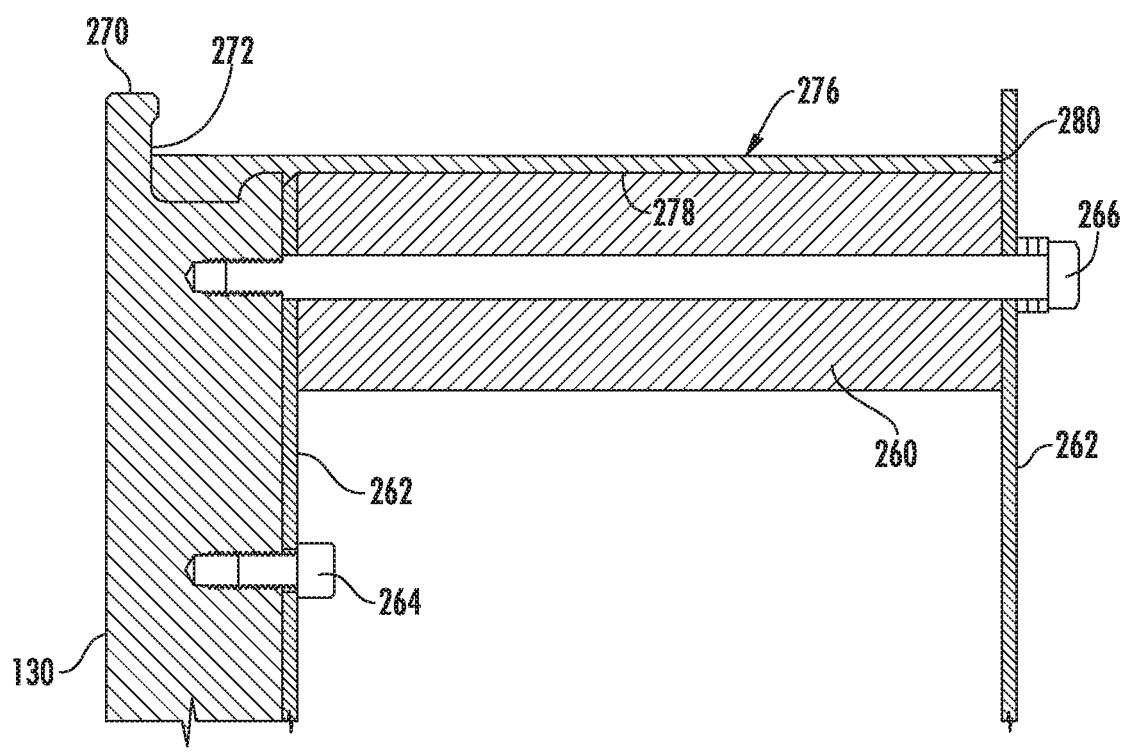
FIG. 18A is a partial cross-sectional view of a first layer of material applied to the hub and mandrel according to step 404 of the flow diagram shown in FIG. 16.

Referring now to FIGS. 18A-18B, step 404 comprises building up a first layer 280 of epoxy-based fiberglass on top of the surface 278 and into the annular recess 272. The first layer 280 is preferably of a substantially uniform thickness of about 0.157 inches over the surface 278 of the mandrel 260, and preferably has a different thickness over the annular recess 272. It is to be understood, however, that the first layer 280 can have varying thicknesses and more than two portions with different thickness, as required by the size of the drum 226 and the expected operational variables for the generator assembly 100. The first layer 280 is preferably made of epoxy-based fiberglass, but any other suitable material can be used as is known in the art. The first layer 280 is the innermost layer of the cylindrical sidewall 276 of the drum 226, and may function to provide structural support to the remaining layers of the cylindrical sidewall 276.

Figure 19B:
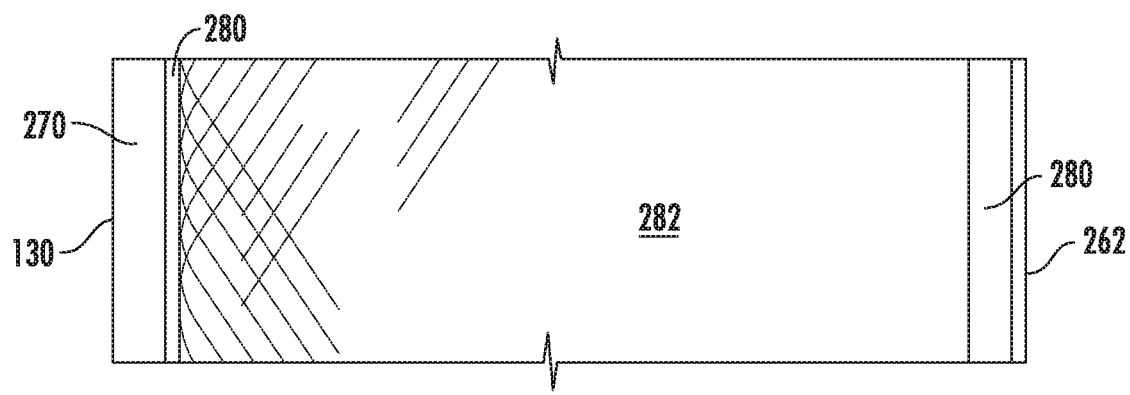
FIG. 19B is a partial top plan view of an external axial surface of the seat shown in FIG. 19A.
Figure 19A:
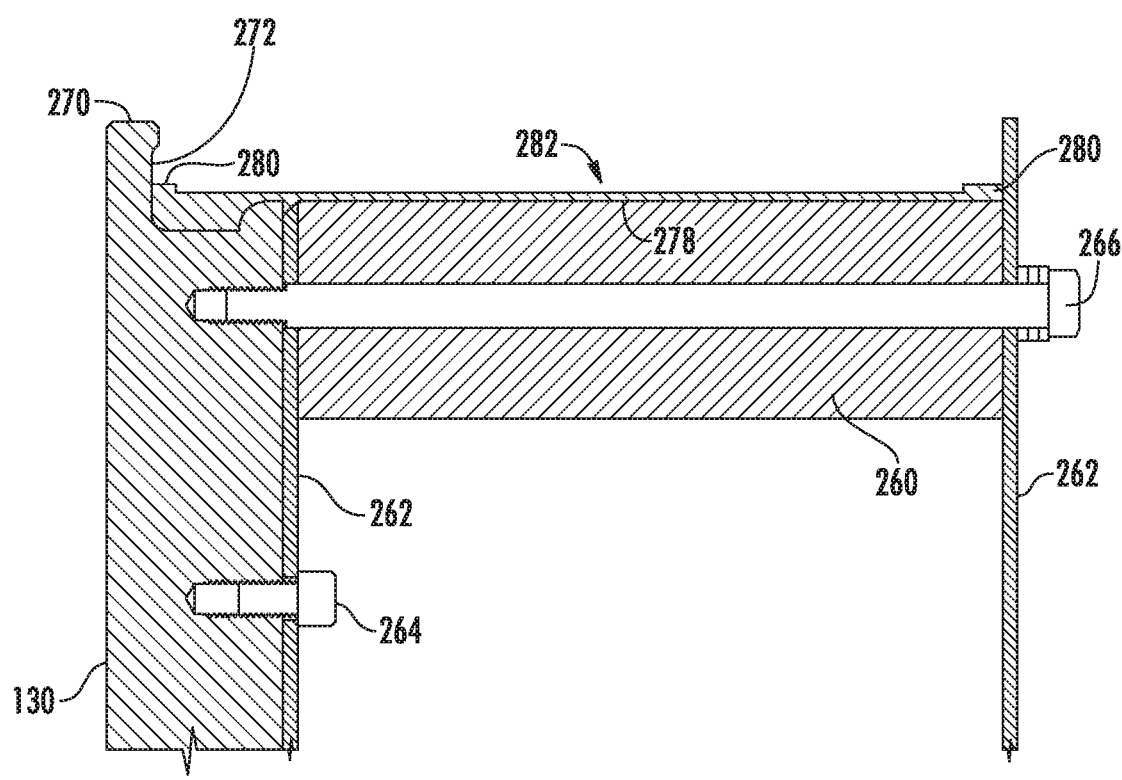
FIG. 19A is a partial cross-sectional view of a seat cut into the first layer of material applied to the hub and mandrel according to step 406 of the diagram shown in FIG. 16.

Referring now to FIGS. 19A-19B, step 406 comprises machining away a seat 282 into the first layer 280. The seat 282 preferably has a width which extends at least partially over the annular recess 272 and at least partially over the surface 278, and is preferably of uniform thickness (or depth). It is to be understood however that the seat 282 can have two or more areas of different thickness or depths, and may not extend over the annular recess 272.

Figure 20B:
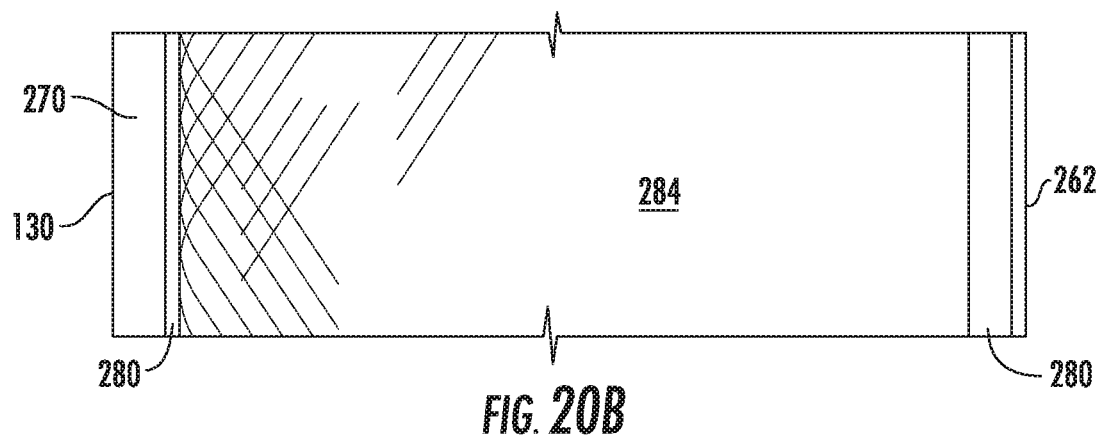
FIG. 20B is a partial top plan view of the second layer of material shown in FIG. 20A.
Figure 20A:
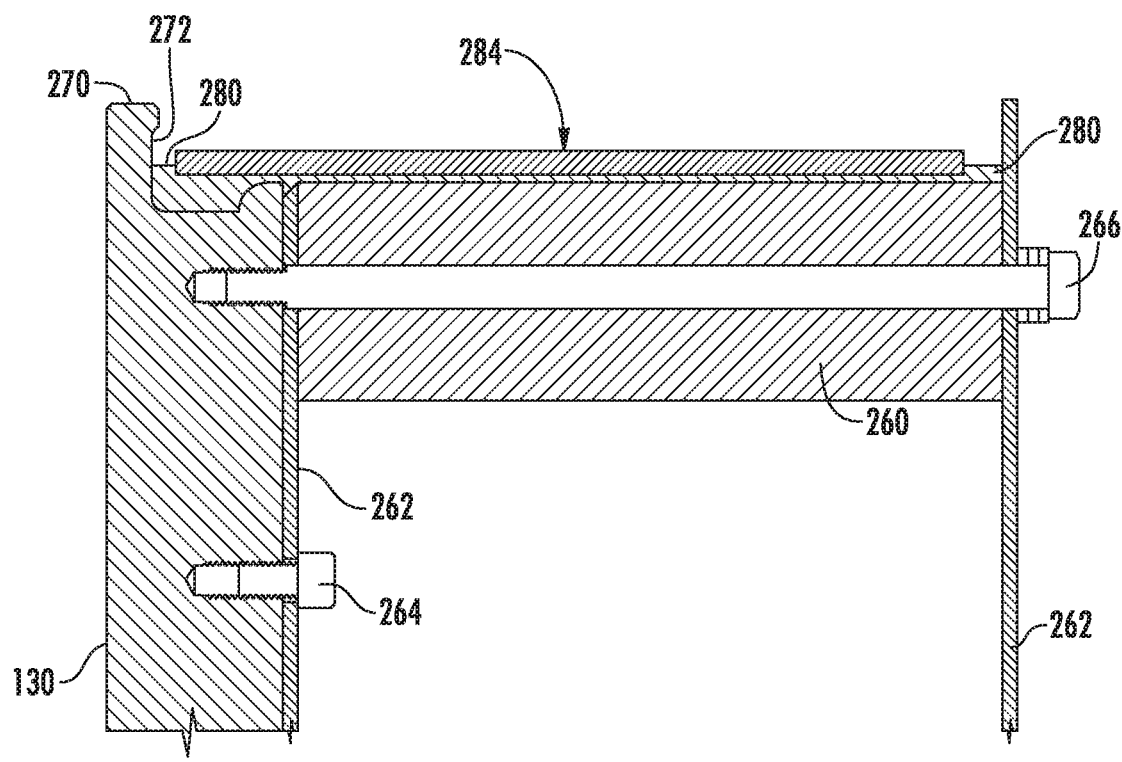
FIG. 20A is a partial cross-sectional view of a second layer of material applied inside the seat in the first layer of material according to step 408 of the flow diagram shown in FIG. 16.

Referring now to FIGS. 20A-20B, step 408 comprises wrapping a second layer 284 of a magnetic shielding film around the first layer 280, such that the width of the second layer 284 is preferably substantially the same as the width of the seat 282. The second layer 284 can be made of a magnetic shielding film such as the film sold under the trademark Metglas®, and described in Published U.S. patent application Ser. No. 11/320,744. Alternatively, any material that is resistant to becoming permanently magnetized and can redirect a magnetic field can be used to form the second layer 284. In one non-limiting example, one or more suitable amorphous or crystalline metal alloy ribbon, film, or wire having the desired mechanical and electromagnetic properties can be used to make up the second layer 284. The second layer 284 is preferably about 0.200 inches thick, but its thickness can vary depending of the size of the drum 226, the strength of the magnetic field used, or other operational variables of the generator assembly 100. The second layer 284 functions to create a magnetic field impermeable cylindrical layer 284 of the cylindrical sidewall 276 of the drum 226.

Figure 21B:
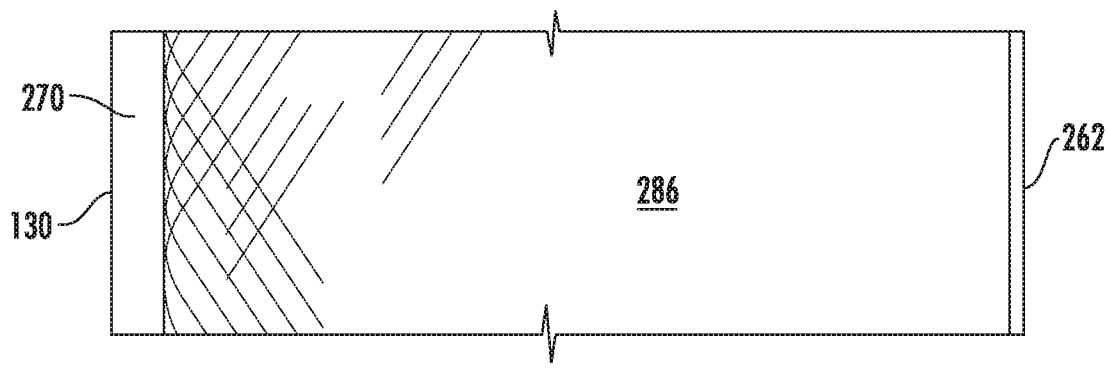
FIG. 21B is a partial top plan view of the external axial surface of the third layer of material shown in FIG. 21A.
Figure 21A:
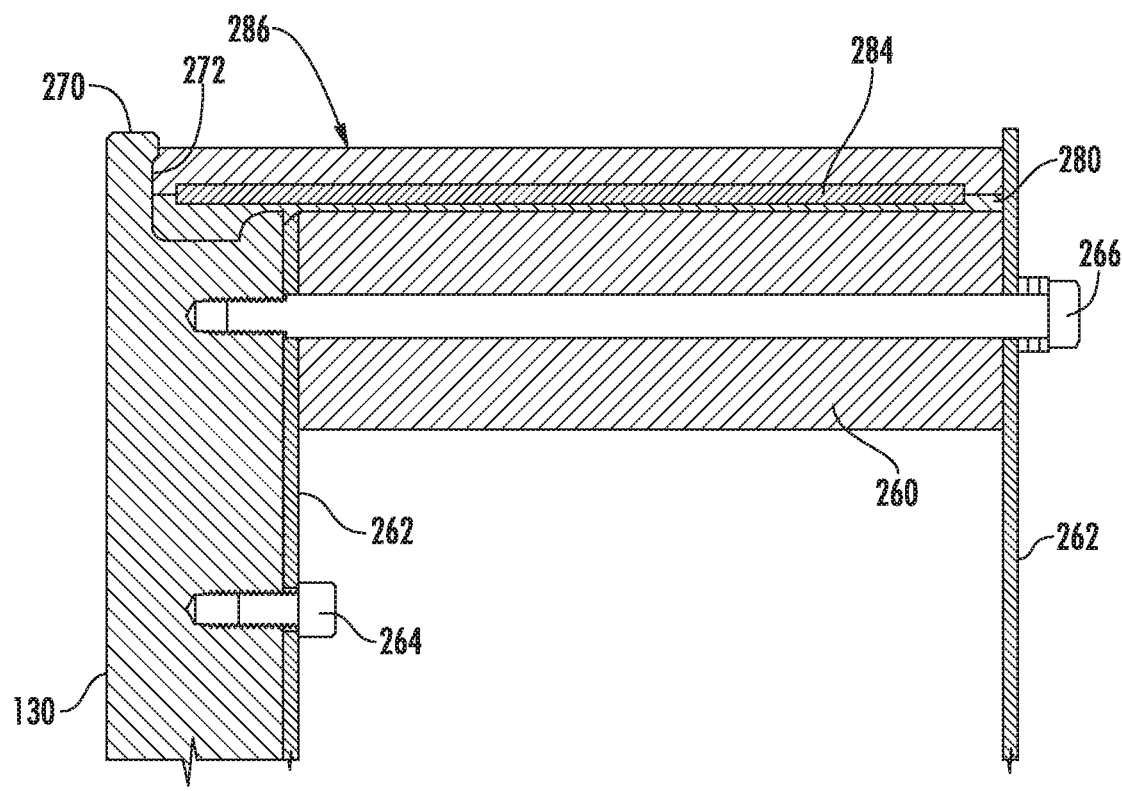
FIG. 21A is a partial cross-sectional view of a third layer of material applied over the first and the second layer of material according to step 410 of the flow diagram shown in FIG. 16.

Referring now to FIGS. 21A-21B, step 410 comprises building up a third layer 286 of epoxy based fiberglass on top of the surface 278 and the lateral surface 270, such that the width of the third layer 286 is preferably substantially equal to the width of the first layer 280. The third layer 286 is preferably of a substantially uniform thickness over the second layer 284, and preferably has a different thickness over the first layer 280. It is to be understood however that the third layer 286 can have varying thicknesses and more than two zones with different thickness, as required by the size of the drum 226 and the expected operational variables for the generator assembly 100. The third layer 286 is preferably made of epoxy-based fiberglass, but any other suitable material can be used. The third layer 286 preferably cooperates with the first layer 280 to substantially completely enclose the second layer 284, and to provide structural support to the second layer 284.

Figure 22B:
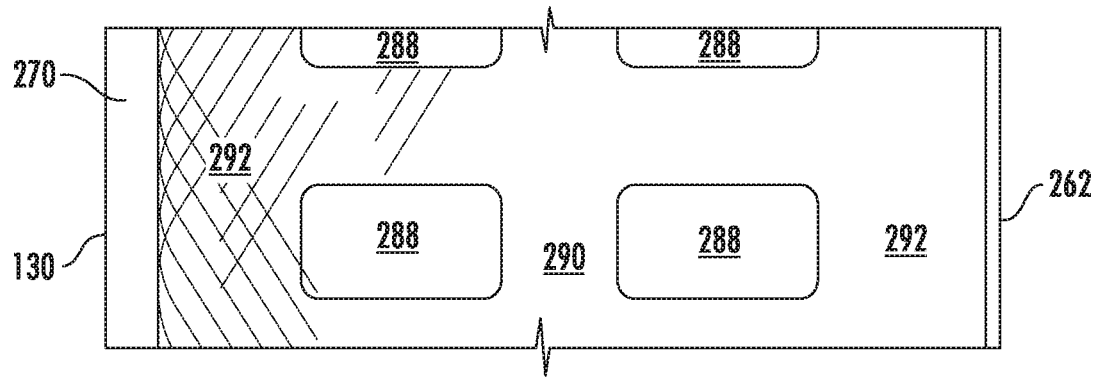
FIG. 22B is a partial top plan view of the external axial surface of the first, second, and third layers of material applied to the hub and mandrel shown in FIG. 22A.
Figure 22A:
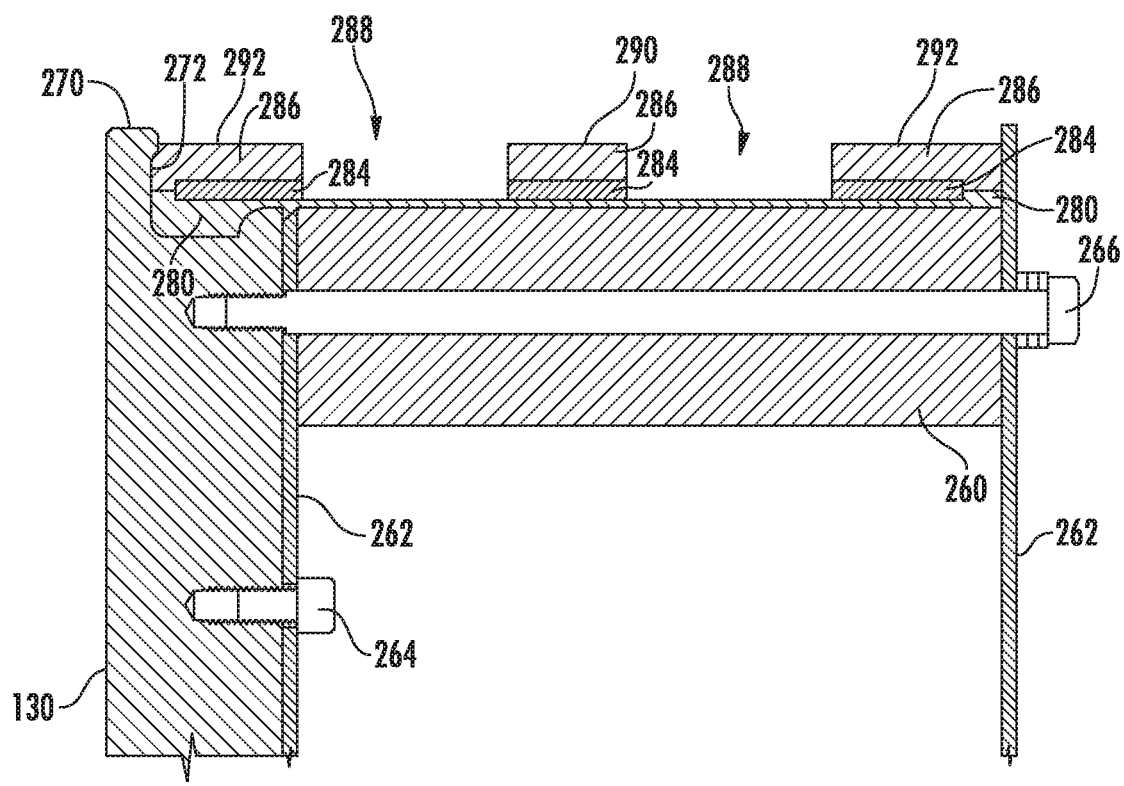
FIG. 22A is a partial cross-sectional view of apertures being cut through the third and second layers of material applied to the hub and mandrel according to step 412 of the flow diagram shown in FIG. 16.

Referring now to FIGS. 22A-22B, step 412 comprises forming magnetic field permeable apertures 288 into the cylindrical sidewall 276. The apertures 288 can be formed by substantially completely cutting through the third layer 286 and the second layer 284, and preferably only partially cutting through the first layer 280, for example. Preferably, two apertures 288 are formed along a straight axial line on the cylindrical sidewall 276, the two apertures preferably being separated by a middle zone 290, where none of the third layer 286, the second layer 284, and the first layer 280, have been cut through. The two apertures 288 can further define two end zones 292 where no layers have been cut. It is to be understood that only one aperture 288 or more than two apertures 288 may be cut into one or more of the layers of the cylindrical sidewall 276. Further, the apertures 288 may not extend into the first layer 280, so long at the apertures 288 extend substantially completely through the second layer 284. The apertures 288 may be formed by any means known in the art.

The apertures 288 function to create magnetic field permeable zones 294 into the cylindrical sidewall 276. The apertures 288 can be substantially rectangular in shape and can have dimensions of 1 inch by 1.75 inch for example. However, the sizes and shapes of the apertures 288 may be varied without departing from the scope of the inventive concepts disclosed herein.

A second set of apertures 288 may be formed as described above after rotating the mandrel 260 exactly 12° by using an indexing mechanism. Preferably, thirty pairs of apertures 288 are cut into the layers of the drum 226, which thirty pairs are spaced 12° apart in order to cover the entire 360° of the cylindrical sidewall 276 of the drum 226. This preferred number and orientations of apertures 288 are related to the preferred number of six flux assemblies 104*a* as follows: the six flux assemblies 104*a* are evenly spaced about the cylindrical sidewall 276 of the drum 226, resulting in a 60° of separation between the flux assemblies 104*a*. Each aperture 288 defines a magnetic field permeable zone 294 along the cylindrical sidewall 276 of the drum 226. The remaining zones 296 are magnetic field impermeable due to the second layer 284.

In order to balance the pull of the magnets 172 onto the magnetic field impermeable zones 296 and avoid wobble, the number of pairs of apertures 288 can be preferably divisible by both 2 and 3, in order to ensure that the pairs of apertures 288 are positioned such that any two diametrically opposed pairs of flux assemblies 104*a* are preferably either simultaneously aligned with an aperture 288, or are simultaneously aligned with a magnetic field impermeable zone 296. Other suitable numbers of pairs of apertures could be: thirty-six (spaced 10° apart), twenty-four (spaced 15° apart), eighteen (spaced 20° apart), twelve (spaced 30° apart), or six (spaced 60° apart), for example. It should be appreciated that if a number of flux assemblies 104*a* different than six is used, a different relationship between the number of flux assemblies 104*a* and the number or apertures 288 may be used. The calculation of the relationship between the number of flux assemblies 104*a* and the number of apertures 288 would be routine for a person skilled in the art having the benefit of the instant disclosure.

It is to be understood that the number of apertures 288 may be varied along with the shape and size of the apertures 288, and the distance in degrees between the several pairs of apertures 288. It is also to be understood that a single pair of apertures 288 may be used in some exemplary embodiments of the inventive concepts disclosed herein.

Figure 23B:
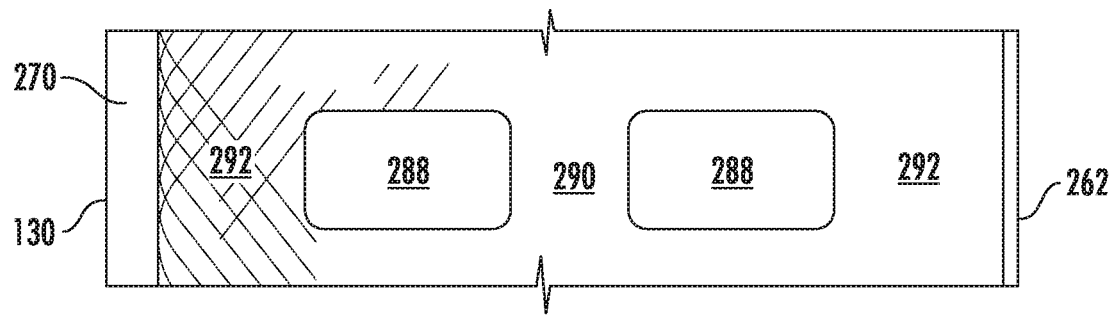
FIG. 23B is a partial top plan view of the external axial surface of the first, second, and third layers of material applied to the hub and mandrel shown in FIG. 23A.
Figure 23A:
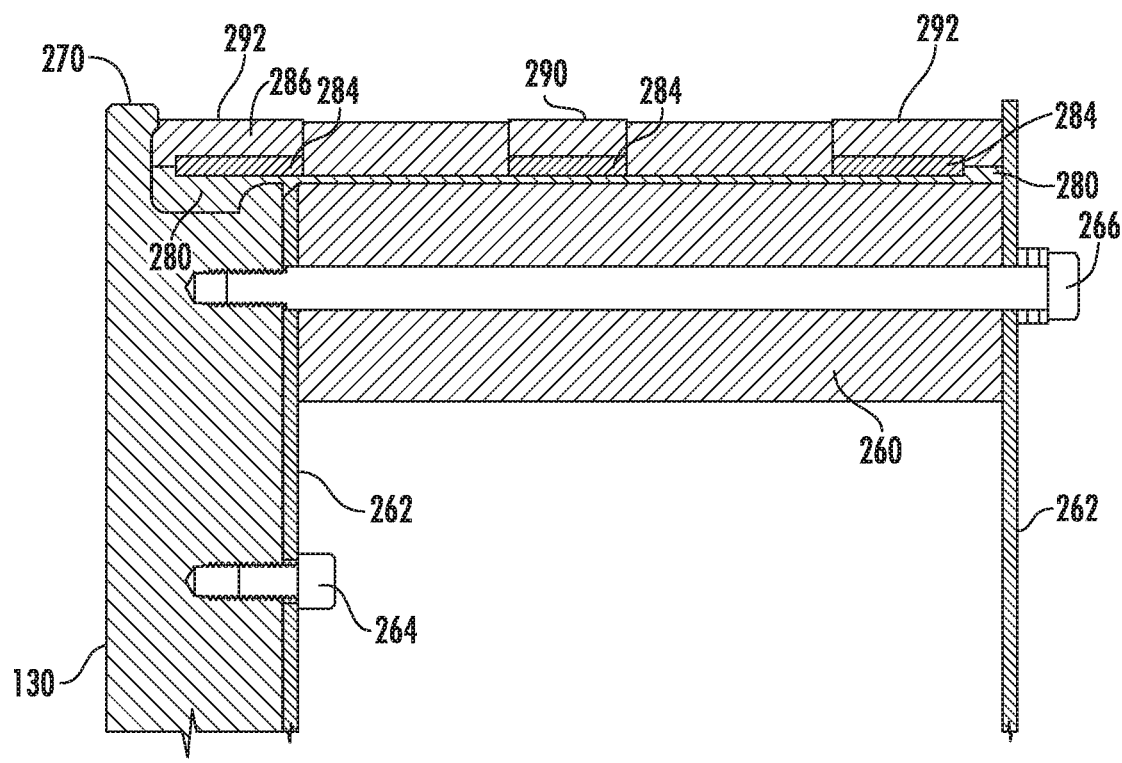
FIG. 23A is a partial cross-sectional view of the filling of the apertures with epoxy to the height of the third layer according to step 414 of the flow diagram shown in FIG. 16.

Referring now to FIGS. 23A-23B, step 414 comprises filling the apertures 288 with epoxy or other suitable material to a thickness preferably substantially equal to the thickness of the third layer 286. It is to be understood that any suitable material can be used instead of epoxy. It is also to be understood that the thickness of the epoxy may vary.

Figure 24B:
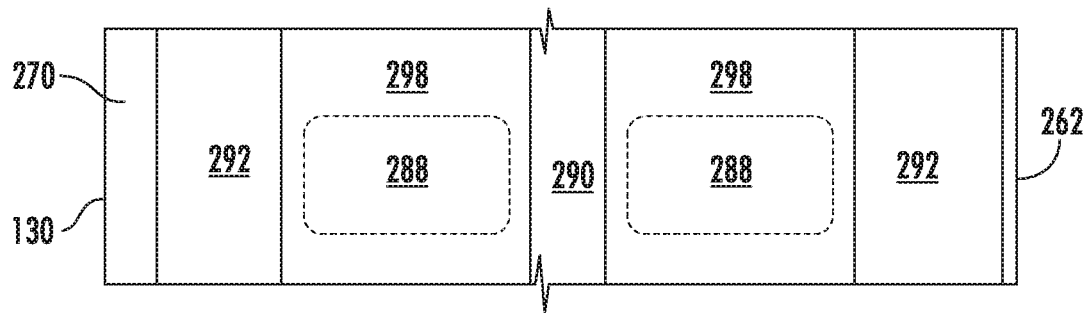
FIG. 24B is a partial top plan view of the external axial surface of the drum shown in FIG. 24A.
Figure 24A:
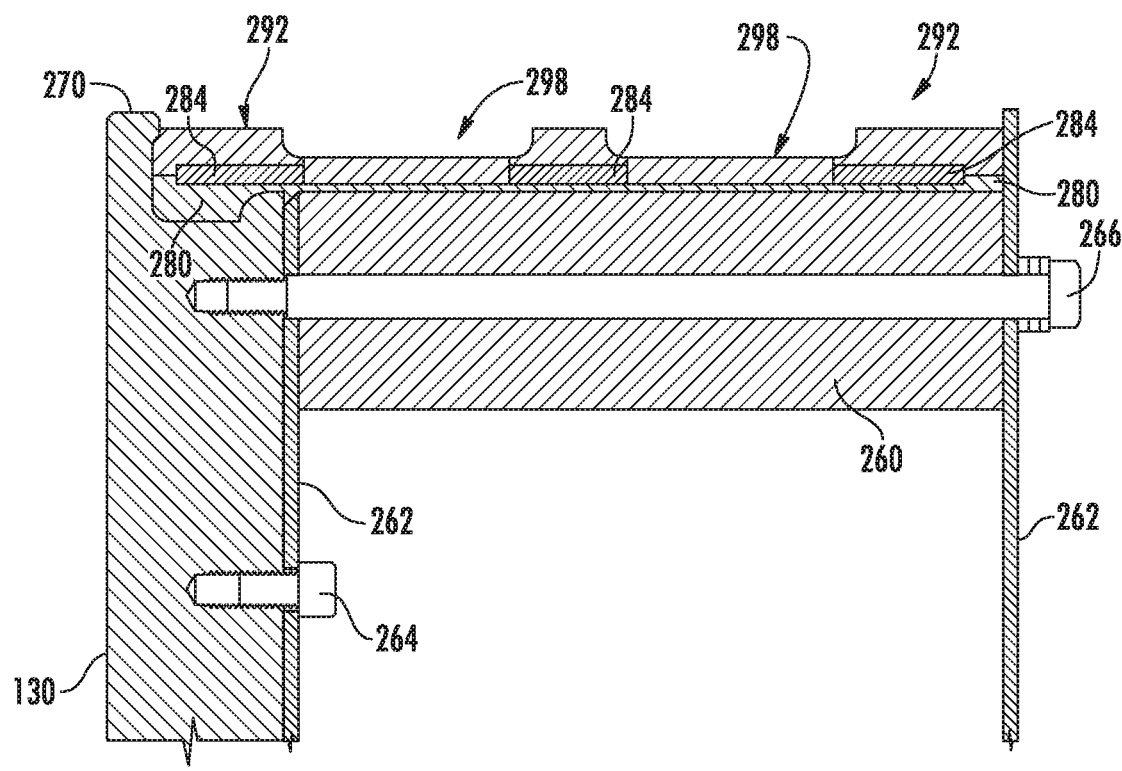
FIG. 24A is a partial cross-sectional view of the two annular grooves cut into the drum according to step 416 of the flow diagram shown in FIG. 16.

Referring now to FIGS. 24A-24B, step 416 comprises forming two or more annular grooves 298 along the entire cylindrical sidewall 276 of the drum 226. The annular grooves 298 may be formed by any method known in the art. The annular grooves 298 are preferably formed with a depth less than the thickness of the third layer 286. The depth of the annular grooves 298 may vary, provided that the annular grooves 298 do not reach the second layer 284. The annular grooves 298 are preferably parallel to one another, and can encompass the apertures 288. The annular grooves 298 are preferably separated by the raised middle zone 290 which also separates the apertures 288. The annular grooves 298 are also preferably framed on both sides by raised end zones 292. The annular grooves 298 can function to provide structural support and strength to the cylindrical sidewall 276 of the drum 226, while at the same time minimize the thickness of the cylindrical sidewall 276 disposed inside the air gap 116. It is to be understood that the number of annular grooves 298 may be varied to correspond to the number of apertures 288. It is also to be understood that alternative embodiments of the inventive concept(s) disclosed herein may have no annular grooves 298, or may have a single annular groove 298, as opposed to multiple annular grooves 298, for example.

Figure 25B:
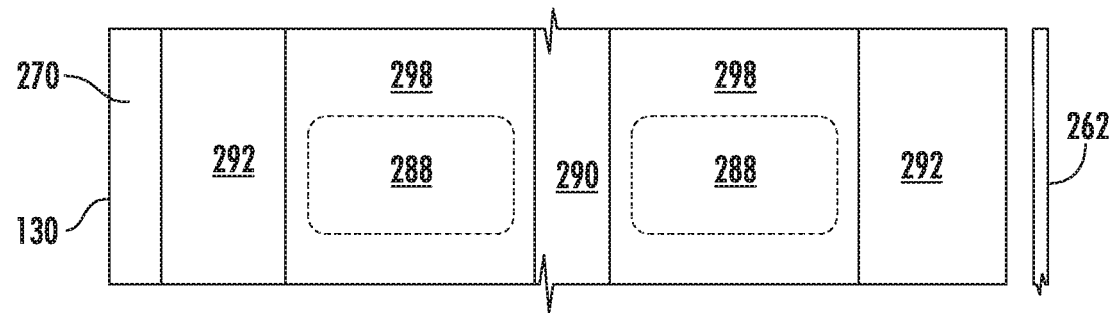
FIG. 25B is a partial top elevated view of the external axial surface of the removal of the mandrel from the drum shown in FIG. 25A.
Figure 25A:
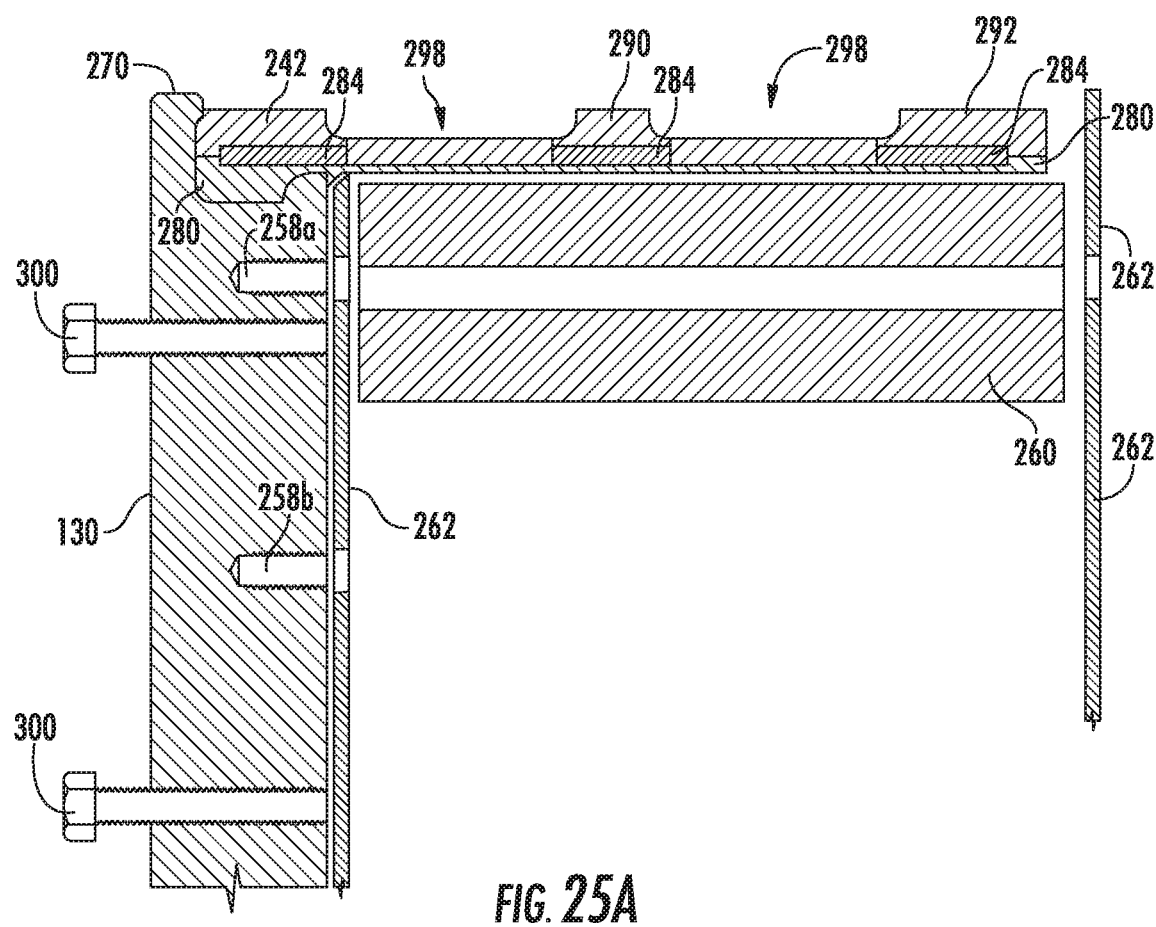
FIG. 25A is a partial cross-sectional view of the removal of the mandrel from the drum according to step 418 of the flow diagram shown in FIG. 16.

Referring now to FIGS. 25A-25B, step 418 comprises removing the mandrel 260 from the drum 226. The short bolt 264 and long bolt 266 can be removed, and two bolts 300 can be used to push the mandrel 260 away from the drum 226 for example. It is to be understood that the mandrel 260 may be removed by any other suitable means known in the art.

Figure 26:
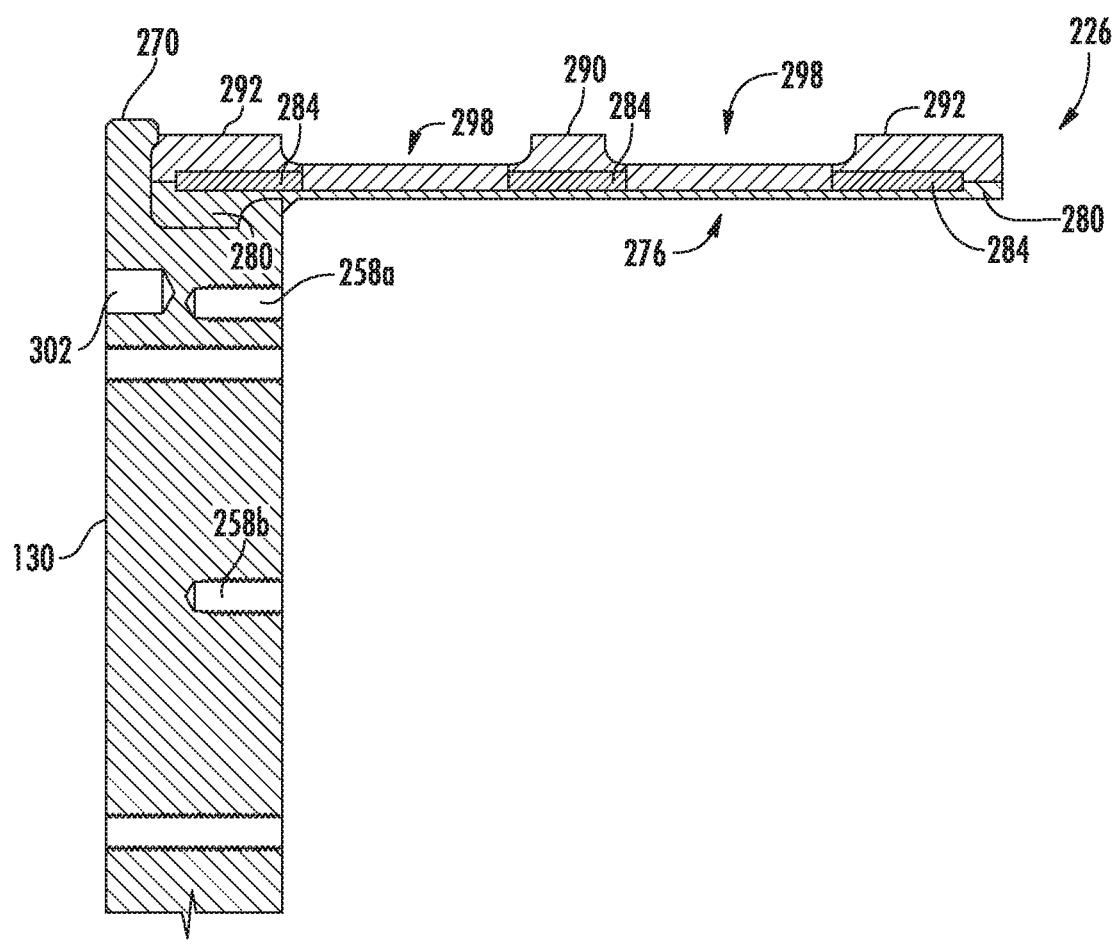
FIG. 26 is a partial cross-sectional view of the finished axial external surface of the drum manufactured according to step 420 of the flow diagram shown in FIG. 16.

Referring now to FIG. 26, step 420 comprises cleaning up and balancing the finished drum 226. If the drum 226 is off-balanced, one or more lightening holes 302 may be drilled into the hub 130. Additionally, the corner of the cylindrical sidewall 276 disposed furthest from the hub 130 may be rounded off. Further, the cylindrical sidewall 276 of the drum 226 may be smoothed or polished, for example. It is to be understood that the drum 226 may be balanced by any other means known in the art, such as sandblasting, grinding, or balancing or correcting weights, and combinations thereof, for example.

It is to be understood that the number of layers comprising the cylindrical sidewall 276 of the drum 226 can be varied from a single layer to four or more layers, for example, and the relative positions of the different layers used may vary. Further, the hub 130 may also comprise the first layer of the drum 226. It is also to be understood that the drum 226 may be manufactured using different methods and materials without departing from the scope and spirit of the inventive concepts disclosed herein. For example, certain arrangements of magnetic field permeable materials may be configured to define a magnetic-field impermeable zone along the sidewall in some embodiments of the instant inventive concepts.

In operation, a generator assembly 100 according to the inventive concepts disclosed herein may generate electricity as follows: the shaft 118 is preferably connected to the shaft 56 of wind generator turbine 50. As wind rotates the blades 52 of the wind generator turbine 50, mechanical energy is provided to rotate the shaft 118, which in turn rotates the cylindrical sidewall 276 inside the air gap 116 separating the magnet 172 from the coil 192. The alternating magnetic field permeable zones 294 and magnetic field impermeable zones 296 of the cylindrical sidewall 276 are preferably alternatively disposed between the magnet 172 and the coil 192 as the drum 226 rotates. The magnetic field permeable zones 294 preferably allow the magnetic field to pass through the cylindrical sidewall 276 of the drum 226, and the magnetic field impermeable zones 296 redirect the magnetic field, such that it does not pass through the cylindrical sidewall 276. This alternating magnetic field creates radial flux, which induces electrical current into the coil 192. The electrical current can then be allowed to flow through an external circuit, and may have its output optimized for its intended use by devices such as rectifiers, inverters, and transformers, for usable voltage and frequency as desired.

The mechanical energy used to rotate shaft 118 of a generator assembly 100 can be supplied from any suitable source such as, but expressly not limited to: a water turbine, a steam turbine, an internal combustion engine, a steam engine, a coal turbine, or a water wheel, for example. The connection between the shaft 56 of the wind generator turbine 50 and the shaft 118 of the generator assembly 100 may be a direct mechanical connection, or alternatively a gearbox, a speed control assembly, or a brake assembly may be used to connect the shaft 56 to the shaft 118. It should also be understood that, because of the nature of the design and the ability to reconfigure the drum 226 with multiple apertures and flux assemblies, this device is well adapted for, but not limited to, low rpm environments, such as wind or water driven turbines, as more than one magnetic field change can be induced in a single rotation of the drum 226.

Figure 27:
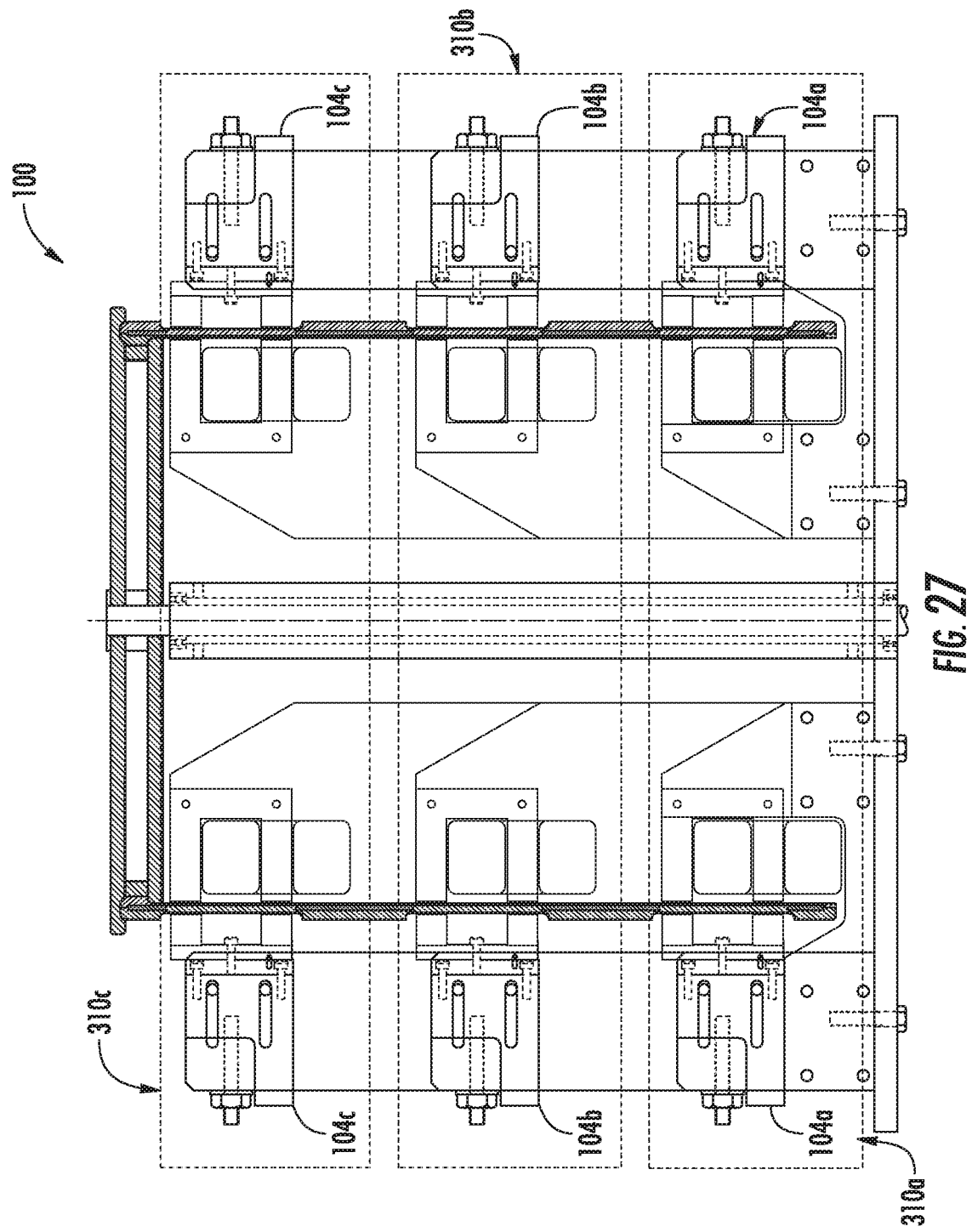
FIG. 27 is a partial side view of a generator of electrical energy in accordance with the inventive concepts disclosed herein, having a plurality of rows of flux assemblies that are angularly offset relative to one another.
Figure 28:
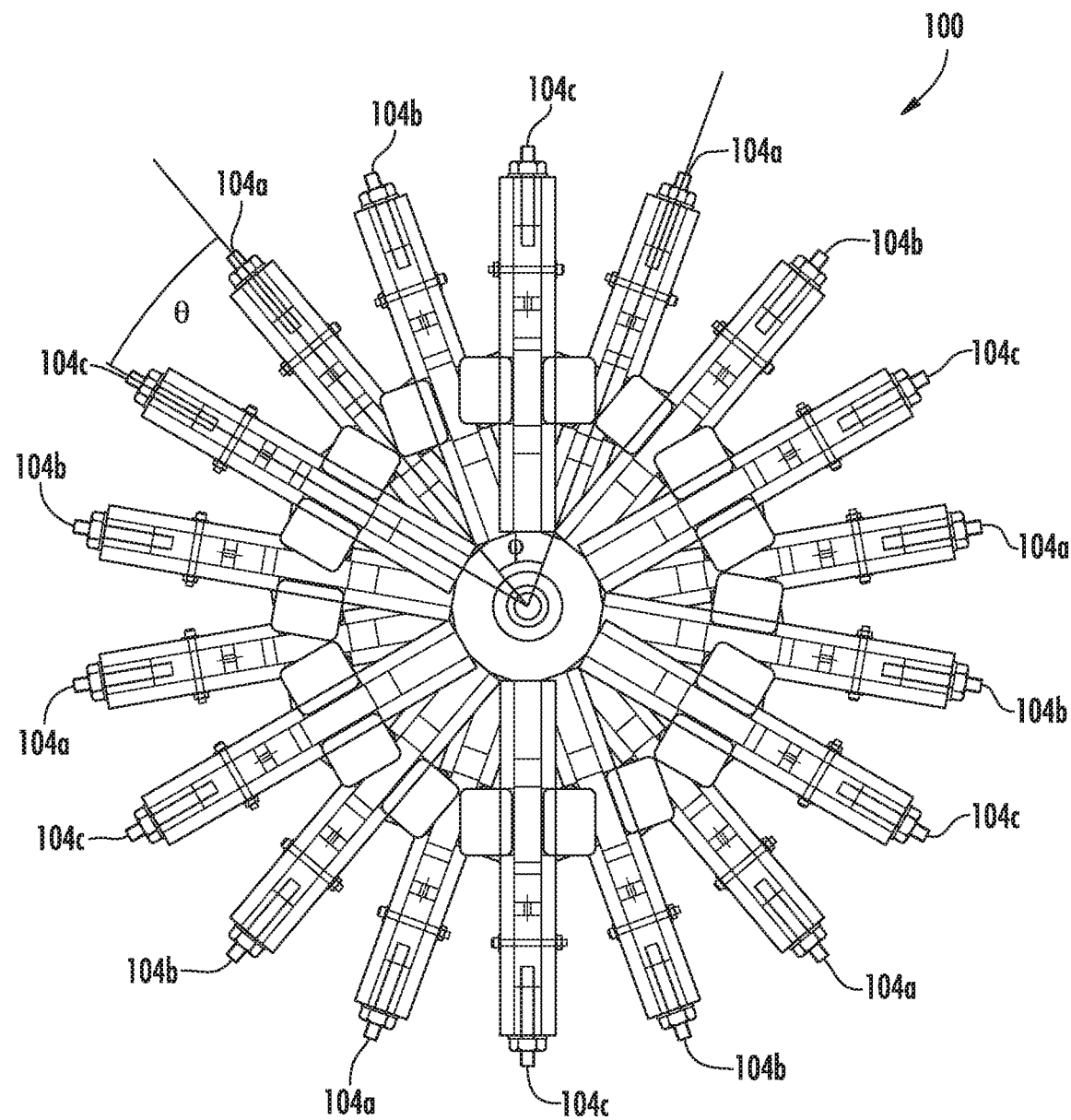
FIG. 28 is a partial front view of the generator of electrical energy of FIG. 27, with the interference drum assembly not shown for clarity.

It is to be understood that the dimensions given and described herein may not be suitable for a commercial embodiment of a generator assembly 100 according to the inventive concepts disclosed herein. A commercial embodiment of a generator assembly 100 built using the inventive concepts disclosed herein may be much larger in dimensions, and may likely include a large number of flux assemblies 104a. An exemplary commercial embodiment of the inventive concepts disclosed herein is shown in FIGS. 27-28. The generator assembly 100 has a plurality of rows of flux assemblies 104a, 104b, and 104c arranged in a plurality of rows 310 in order to increase the output of the generator assembly 100. The plurality of flux assemblies 104a, 104b, and 104c can for example be positioned such that two or more flux assemblies 104a form a row 310a, two or more flux assemblies 104b form a row 310b, and two or more flux assemblies 104c form a row 310c along the drum 226. One, two, or more than three such rows 310a, 310b, and 310c can be formed by plurality of flux assemblies 104a, 104b, and 104c for increased efficiency. As shown in FIG. 28 the flux assemblies 104 within each row 310 can be offset angularly by a fixed amount $\phi$ (in this example by) 60°. Further, the flux assemblies 104 between each row 310 can be offset angularly by a fixed amount $\theta$ that in this example is 20°. It should be understood that $\phi$ and $\theta$ can vary and will depend either on the number of flux assemblies 104 within each row 310 and/or the number of rows 310 of the generator assembly 100.

It is to be further understood that while permanent magnets have been described as the magnetic field source, electromagnets, combinations of permanent magnets and electromagnets, or any other suitable magnetic field source may also be used with the inventive concepts disclosed herein without departing from the scope and spirit thereof.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and spirit of the inventive concepts disclosed and claimed herein.

What is claimed is:

1. An electromagnetic generator, comprising:
   a first row of flux assemblies, the flux assemblies in the first row having a first coil and a first magnetic field source separated by a first gap;
   a second row of flux assemblies, the flux assemblies in the second row having a second coil and a second magnetic field source separated by a second gap;
   a third row of flux assemblies, the flux assemblies in the third row having a third coil and a third magnetic field source separated by a third gap;
   the flux assemblies in the first row being magnetically and electrically isolated from each other, and offset angularly from the flux assemblies in the second row;
   the flux assemblies in the second row being magnetically and electrically isolated from each other, and offset angularly from the flux assemblies in the third row;
   the flux assemblies in the third row being magnetically and electrically isolated from each other, and offset angularly from the flux assemblies in the first row;
   a shaft; and
   a sidewall connected to the shaft and being at least partially positioned inside the first gap, the second gap, and the third gap, and comprising at least one magnetic field permeable zone and at least one magnetic field impermeable zone; and
   wherein the sidewall is movable in the first gap, the second gap, and the third pap, and relative to the flux assemblies in the first row of flux assemblies, the flux assemblies in the second row of flux assemblies, and the flux assemblies in the third row of flux assemblies to alternatively position the at least one magnetic field permeable zone and the at least one magnetic field impermeable zone inside the first gap, the second gap, and the third gap.

2. The electromagnetic generator of claim 1, wherein the sidewall comprises two or more magnetic field impermeable zones separated by two or more magnetic field permeable zones and the sidewall is movable in the first gap, the second gap, and the third gap, and relative to the flux assemblies in the first row of flux assemblies, the flux assemblies in the second row of flux assemblies, and the flux assemblies in the third row of flux assemblies to alternatively position one of the two or more magnetic field permeable zones and one of the two or more magnetic field impermeable zone inside the first gap, the second gap, and the third gap.

3. The electromagnetic generator of claim 1, wherein the sidewall has a cylindrical configuration.

4. An electromagnetic generator, comprising:
a row of flux assemblies, the flux assemblies each having a coil and a magnetic field source separated by a gap, the flux assemblies being magnetically and electrically isolated from each other;
a shaft;
a sidewall connected to the shaft and being at least partially positioned inside the gaps, the sidewall comprising at least one magnetic field permeable zone and at least one magnetic field impermeable zone; and
wherein the sidewall is movable in the gaps and relative to the coils and magnetic field sources of the flux assemblies to alternatively position the at least one magnetic field permeable zone and the at least one magnetic field impermeable zone inside the gap of only one of the flux assemblies at a particular instant in time.

5. The electromagnetic generator of claim 4, wherein the sidewall comprises two or more magnetic field impermeable zones separated by two or more magnetic field permeable zones and the sidewall is movable in the gaps and relative to the coils and magnetic field sources of the flux assemblies to alternatively position one of the two or more magnetic field permeable zones and one of the two or more magnetic field impermeable zones inside the gap of only one of the flux assemblies at a particular instant in time.

6. The electromagnetic generator of claim 4, wherein the sidewall has a cylindrical configuration.

* * * * *

UNITED STATES PATENT AND TRADEMARK OFFICE
CERTIFICATE OF CORRECTION

PATENT NO. : 11,139,726 B2  
APPLICATION NO. : 16/363713  
DATED : October 5, 2021  
INVENTOR(S) : Carl E. Copeland, Jr.

Page 1 of 1

It is certified that error appears in the above-identified patent and that said Letters Patent is hereby corrected as shown below:

In the Claims  
Column 18, Line 63: After "the third" delete "pap" and replace with -- gap --

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*